(12) United States Patent
Mine et al.

(10) Patent No.: US 8,611,965 B2
(45) Date of Patent: Dec. 17, 2013

(54) ELECTRONIC PEN, INFORMATION PROCESSING SYSTEM, AND PROGRAM

(75) Inventors: Aramu Mine, Nagano (JP); Naoki Matsubara, Nagano (JP); Toyohide Isshi, Kanagawa (JP)

(73) Assignee: Sony Corporation, Tokyo (JP)

(*) Notice: Subject to any disclaimer, the term of this patent is extended or adjusted under 35 U.S.C. 154(b) by 204 days.

(21) Appl. No.: 13/090,541

(22) Filed: Apr. 20, 2011

(65) Prior Publication Data

US 2011/0294417 A1 Dec. 1, 2011

(30) Foreign Application Priority Data

May 28, 2010 (JP) ................................. 2010-123317

(51) Int. Cl.
*H04M 1/00* (2006.01)
*H04B 1/38* (2006.01)

(52) U.S. Cl.
USPC ....................................... 455/566; 455/154.2

(58) Field of Classification Search
USPC ........... 455/41.1, 41.2, 41.3, 566, 556.2, 145, 455/154.2, 158.4
See application file for complete search history.

(56) References Cited

U.S. PATENT DOCUMENTS

| 2009/0236153 A1* | 9/2009 | Kyung et al. ............... 178/19.01 |
| 2009/0295759 A1* | 12/2009 | Thorsell ......................... 345/179 |
| 2011/0019916 A1* | 1/2011 | MacKenzie .................... 382/187 |

OTHER PUBLICATIONS

U.S. Appl. No. 13/698,811, filed Nov. 19, 2012, Mine, et al.
U.S. Appl. No. 13/643,126, filed Oct. 24, 2012, Matsubara, et al.

* cited by examiner

*Primary Examiner* — Ping Hsieh
(74) *Attorney, Agent, or Firm* — Oblon, Spivak, McClelland, Maier & Neustadt, L.L.P.

(57) ABSTRACT

There is provided an electronic pen including a wireless communication section which performs short-range one-to-one communication with a communication partner device having a display section, a pen tip which is for specifying information displayed on the display section, a reception processing section which configures the wireless communication section, and acquires information specified by the pen tip by communication with the communication partner device, a recording section which records the acquired information, and a transmission processing section which configures the wireless communication section, and transmits the information recorded in the recording section.

6 Claims, 33 Drawing Sheets

DISPLAY OF RIPPLE

FIG.13
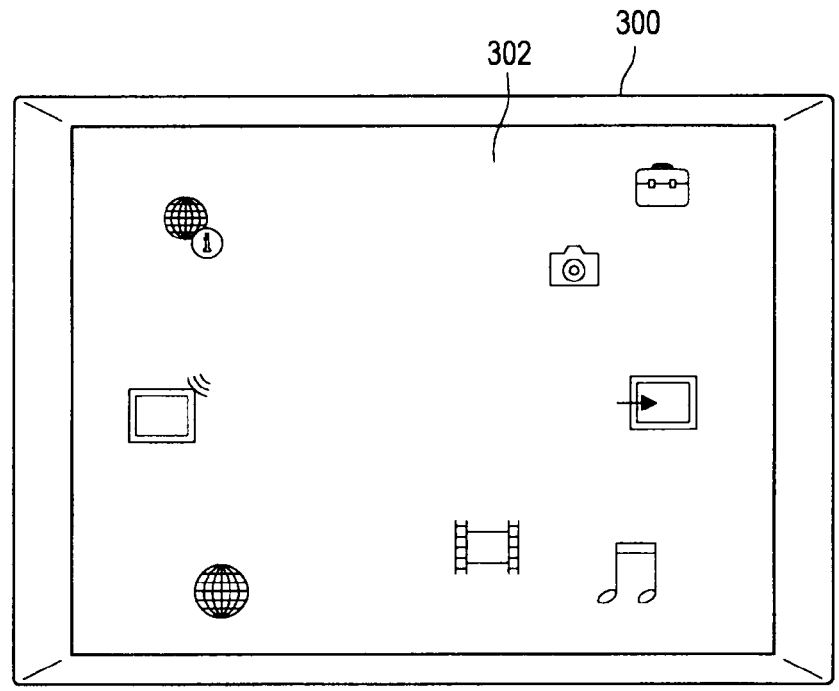
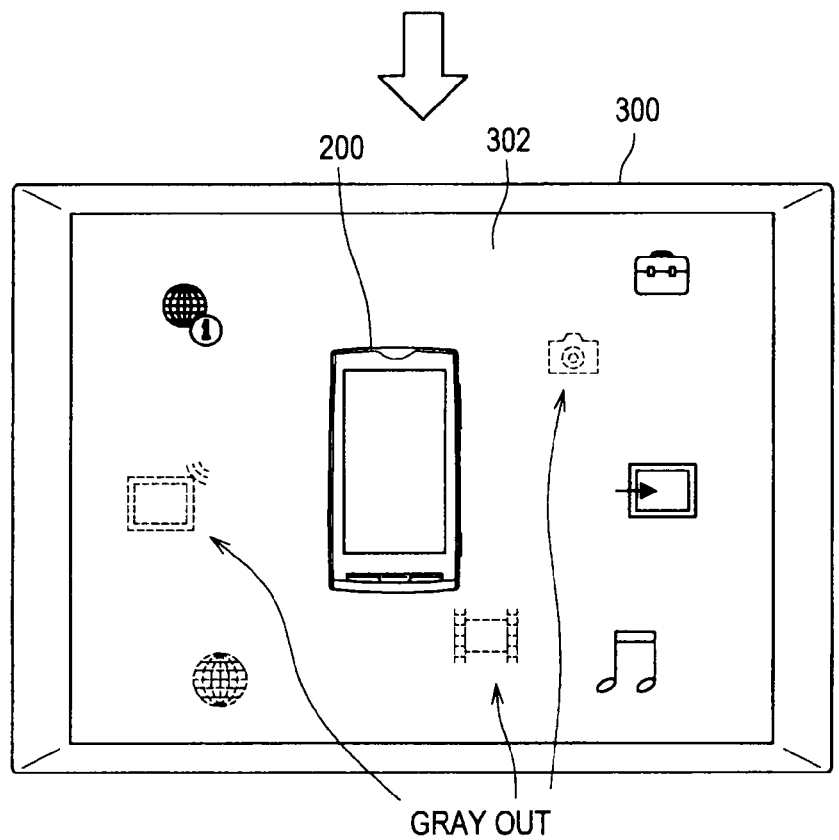
GRAY OUT

FIG.14
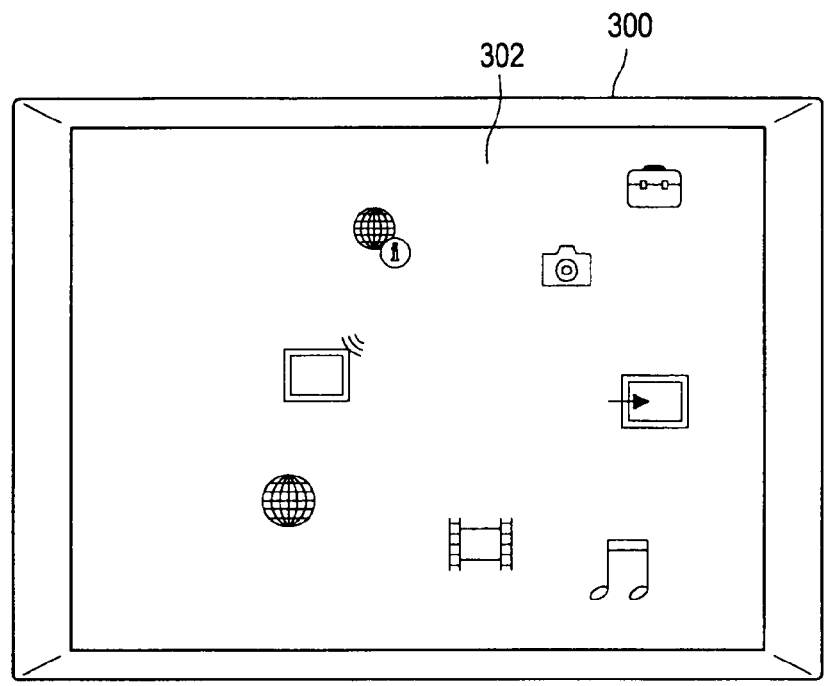
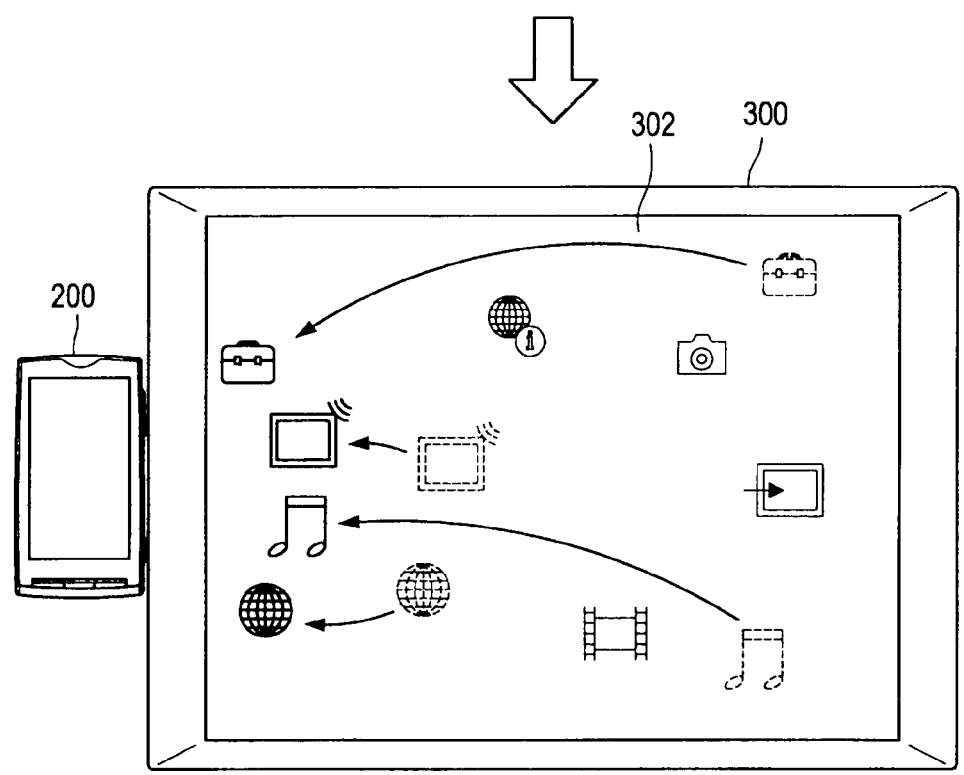

FIG.19
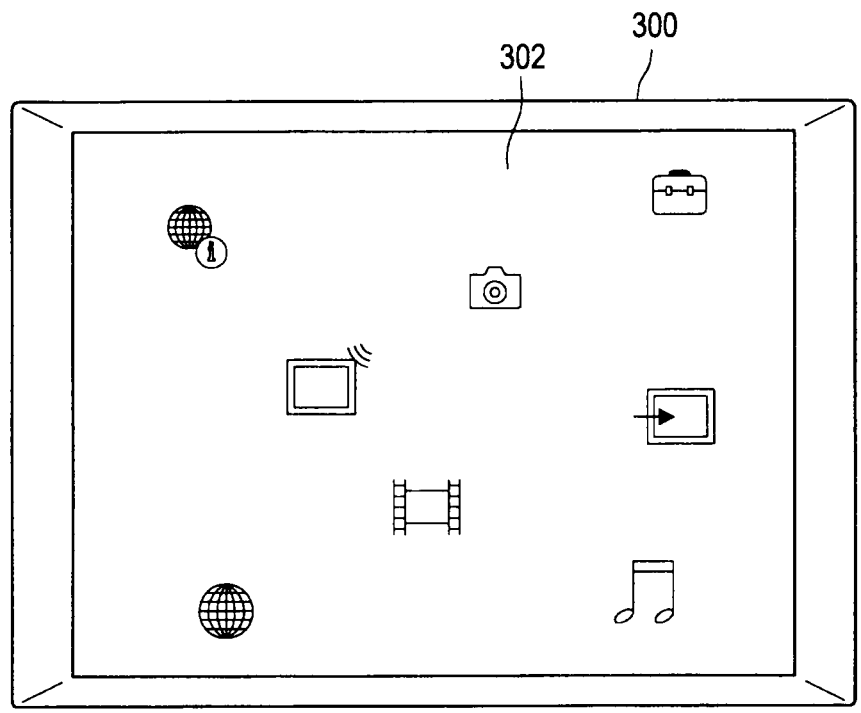
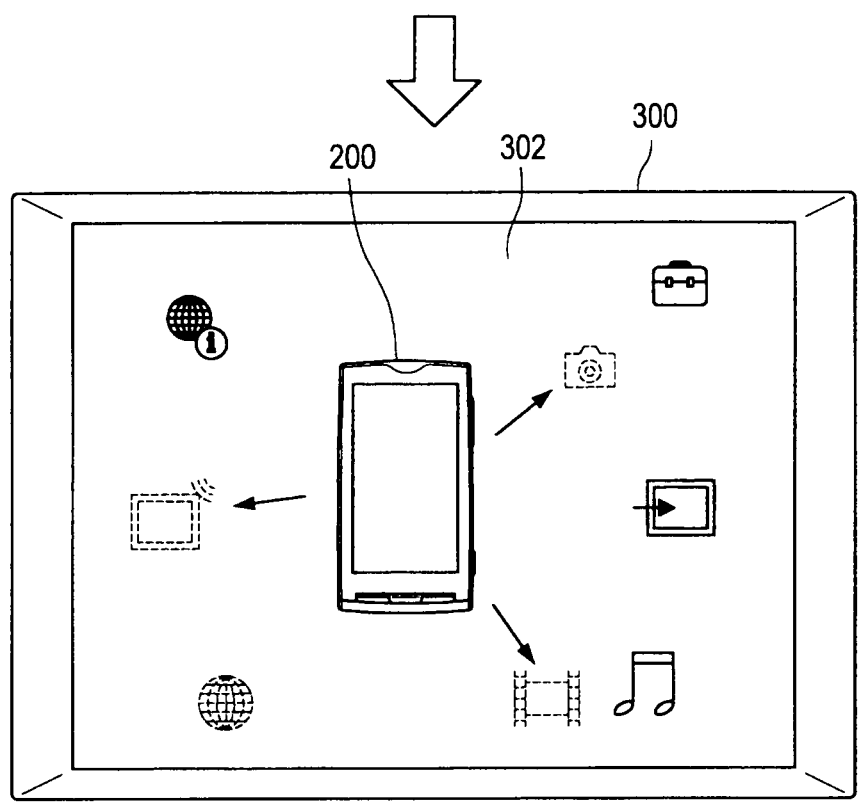

FIG.24
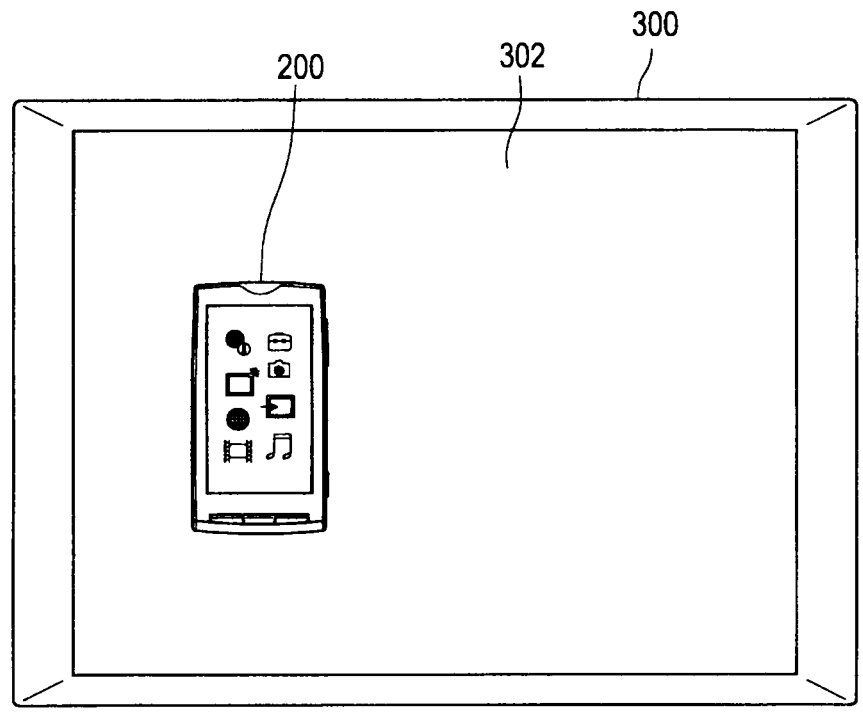
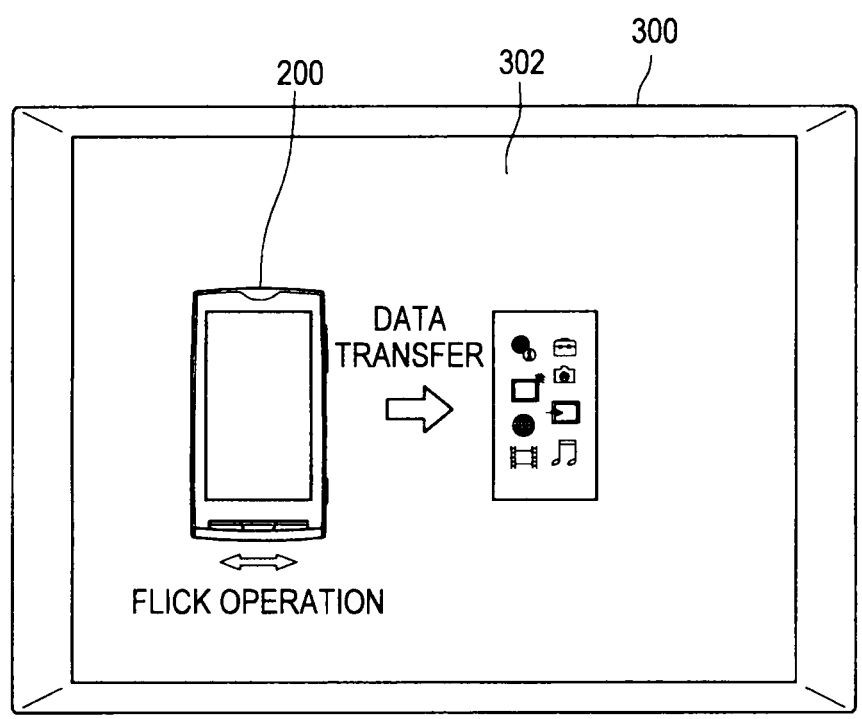

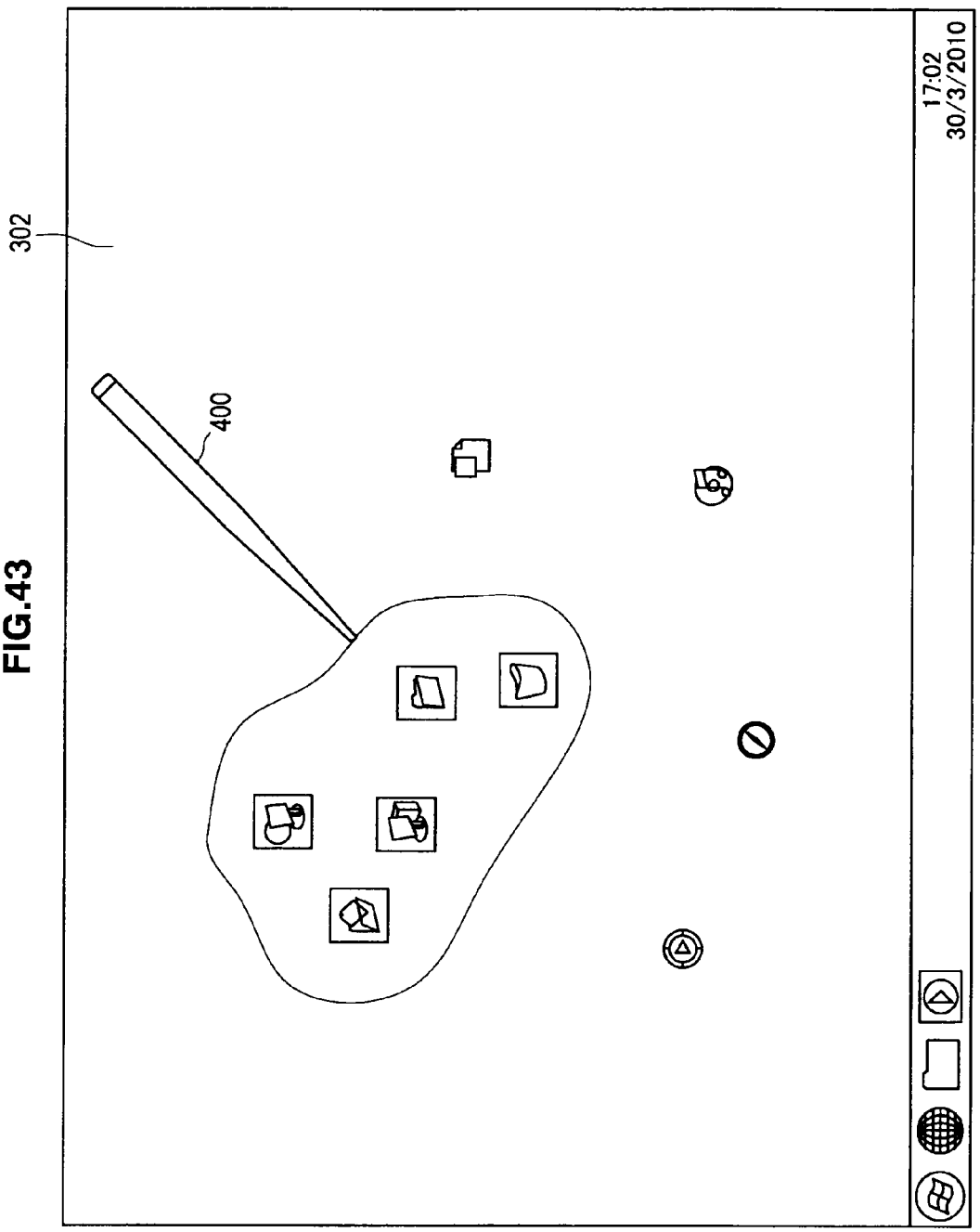

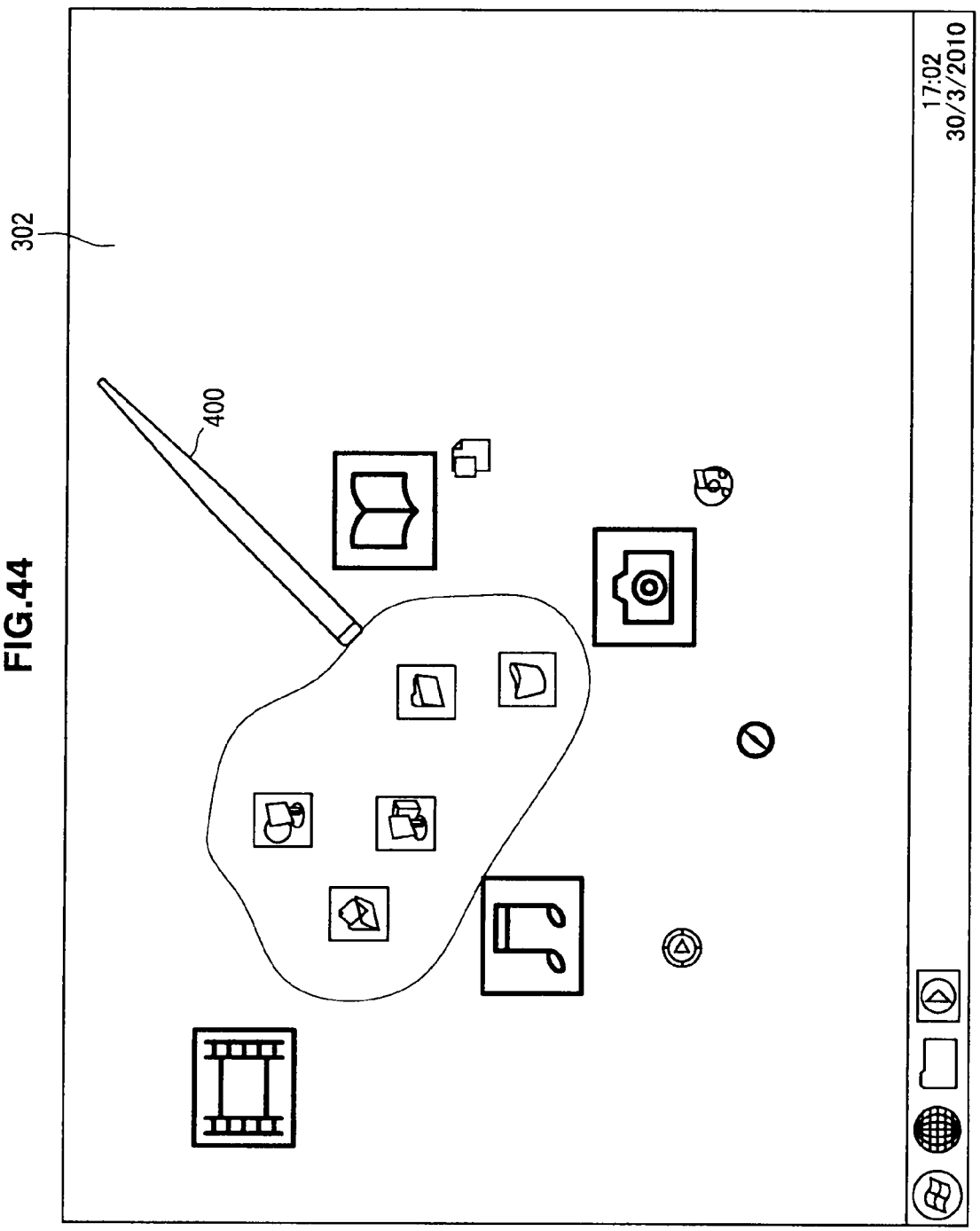

ELECTRONIC PEN, INFORMATION PROCESSING SYSTEM, AND PROGRAM

BACKGROUND OF THE INVENTION

1. Field of the Invention

The present invention relates to an electronic pen, an information processing system, and a program.

2. Description of the Related Art

In related art, in each of the following patent documents, there is described a system which realizes desired operation in the case of wirelessly communicating in a non-contact manner with a mobile device such as a mobile phone. The patent documents are JP 2009-37401A, JP 2007-316925A, JP 2009-25997A, JP 2009-49871A, WO 2003/21875 specification, JP 2009-230469A, JP 2005-100050A, JP 2008-97151A, JP 2008-148148A, and JP 2007-299134A. Further, in JP 2007-299134A, there is described a configuration of an electronic pen using wireless communication.

SUMMARY OF THE INVENTION

However, there is assumed only a case of simply displaying information on a screen in the technology described in each of JP 2009-37401A, JP 2007-316925A, JP 2009-25997A, JP 2009-49871A, WO 2003/21875 specification, JP 2009-230469A, JP 2005-100050A, JP 2008-97151A, JP 2008-148148A, and JP 2007-299134A. Accordingly, it was difficult, when executing various types of information such as content held by one device in another device, to visually and easily recognize the various types of information in a device of a forwarding destination. Further, in the technology described in JP 2007-299134A, it was difficult to easily perform operation of reading information of a territory specified on a display section of an information processing apparatus and transmitting the information onto the display section.

In light of the foregoing, it is desirable to provide an electronic pen, an information processing system, and a program, which are novel and improved, and which are capable of easily performing the operation of reading information of a territory specified on a display section of an information processing apparatus and transmitting the information onto the display section.

According to an embodiment of the present invention, there is provided an electronic pen which includes a communication section which performs short-range one-to-one communication with a communication partner device having a display section, a pen tip which is for specifying information displayed on the display section, a reception processing section which configures the communication section, and acquires information specified by the pen tip by communication with the communication partner device, a recording section which records the acquired information, and a transmission processing section which configures the communication section, and transmits the information recorded in the recording section.

Further, according to another embodiment of the present invention, there is provided an information processing system which includes an information processing apparatus which includes a display section, and communicates with an electronic pen by short-range one-to-one communication, and the electronic pen which includes a communication section which performs short-range one-to-one communication with the information processing apparatus, a pen tip which is for specifying information displayed on the display section, a reception processing section which configures the communication section, and acquires information specified by the pen tip by communication with the information processing apparatus, a recording section which records the acquired information, and a transmission processing section which configures the communication section, and transmits the information recorded in the recording section.

Further, according to another embodiment of the present invention, there is provided a program for causing a computer to function as a unit configured to perform short-range one-to-one communication with a communication partner device having a display section, a unit configured to configure the communication section, and to acquire information specified by a pen tip by communication with the communication partner device, a unit configured to record the acquired information, and a unit configured to configure the communication section, and to transmit the recorded information.

According to the embodiments of the present invention described above, there can be provided the electronic pen, the information processing system, and the program which are capable of easily performing the operation of reading information of a territory specified on the display section of the information processing apparatus and transmitting the information onto the display section.

BRIEF DESCRIPTION OF THE DRAWINGS

FIG. 13 is a schematic view showing a state where, among functional icons, a functional icon which is not available grays out and a functional icon which is available is displayed brightly depending on a function of the mobile device;

FIG. 14 is a schematic view showing a state where an available icon is moved in the vicinity of the mobile device;

FIG. 19 is a schematic view showing an example in which an icon moves in a manner to keep away from the mobile device;

FIG. 24 is a schematic view showing a state where, when content which is being reproduced in the mobile device is flicked on the display section, data is transferred to the information processing apparatus;

FIG. 43 is a schematic view showing a state of using the electronic pen; and

FIG. 44 is a schematic view showing a state of using the electronic pen.

DETAILED DESCRIPTION OF THE EMBODIMENTS

Figure 1:
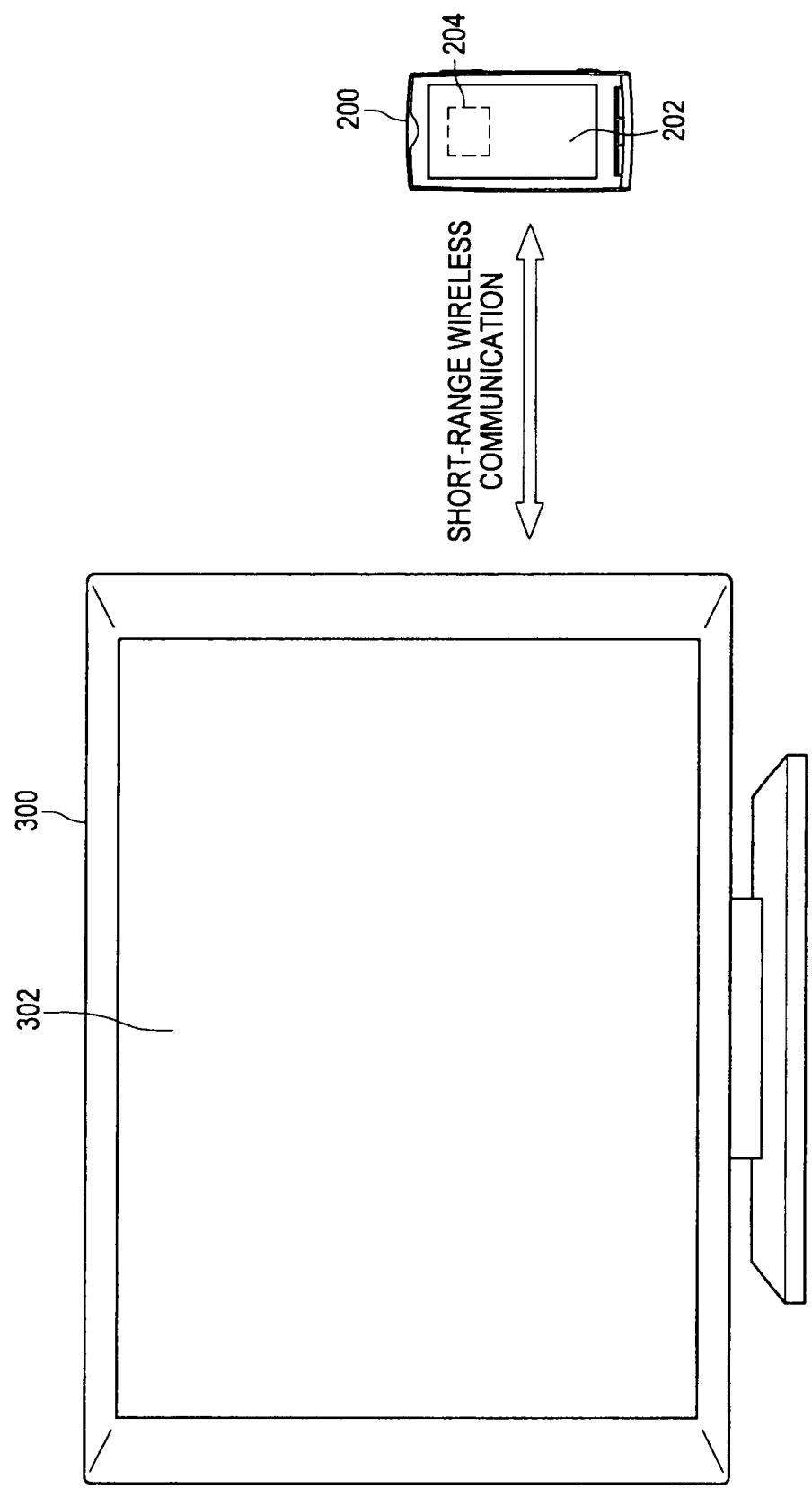
FIG. 1 is a schematic view showing a configuration example of an information processing system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment (display processing when connecting mobile device to information processing apparatus)
2. Second embodiment (content movement between mobile device and information processing apparatus)
3. Third embodiment (synchronization of information between mobile device and information processing apparatus)
4. Fourth embodiment (guidance to position with good communication status)
5. Fifth embodiment (configuration example of electronic pen)

1. First Embodiment

FIG. 1 is a schematic view showing a configuration example of an information processing system according to a first embodiment of the present invention. As shown in FIG. 1, an information processing system 100 according to the embodiment of the present invention is configured from a mobile device 200 and an information processing apparatus 300 including a display section 302 (display) which is relatively large in size.

The mobile device 200 and the information processing apparatus 300 are configured such that large-capacity data can be transferred therebetween by short-range wireless communication. As a mode of the short-range wireless communication, there may be used TransferJet (registered trademark), for example.

The mobile device 200 is an electronic device having functions as a mobile phone, a smartphone, a digital camera, and the like. There is provided a display section 202 to the mobile device 200. The information processing apparatus 300 is a device such as a personal computer (PC) and a television receiver, and includes the relatively large sized display section 302 configured from a liquid crystal display (LCD) panel, for example. There is provided a touch panel (touch sensor) on the whole surface of the display section 302.

In the system, when the mobile device 200 is brought closer to the information processing apparatus 300, the connection between the mobile device 200 and the information processing apparatus 300 is established by the short-range wireless communication. Then, information held by the mobile device 200 is transmitted to the information processing apparatus 300, and on the display section 302 of the information processing apparatus 300, there is displayed a result of performing processing corresponding to the transmitted information.

The mobile device 200 and the information processing apparatus 300 include an electrode plate (antenna) 204 and an electrode plate (antenna) 304, respectively, which are called electric field couplers capable of mutually establishing electric field coupling. When the electric field coupler of the mobile device 200 and the electric field coupler of the information processing apparatus 300 come close to each other, for example, when the distance between the electric field couplers is 3 cm or less, one-to-one electric field communication between the mobile device 200 and the information processing apparatus 300 is realized by one electric field coupler sensing a change of an induction electric field generated by the other electric field coupler.

More specifically, among a pair of devices performing the electric field communication, one device functions as an initiator and the other device functions as a responder. The initiator makes a connection establishment request, and the responder waits for the connection establishment request from the initiator.

For example, in the case where the mobile device 200 shown in FIG. 1 functions as the initiator and the information processing apparatus 300 shown in FIG. 1 as the responder, when the mobile device 200 and the information processing apparatus 300 are brought close to each other, the information processing apparatus 300 receives the connection establishment request (connection request frame) transmitted from the mobile device 200. Then, when the connection establishment request is received by the information processing apparatus 300, the information processing apparatus 300 transmits a connection response permission (connection response frame) to the mobile device 200. Then, when the mobile device 200 receives the connection response permission, the connection of communication between the information processing apparatus 300 and the mobile device 200 is established. After the connection is established, or at the same time as the connection establishment, the information processing apparatus 300 and the mobile device 200 perform authentication processing, and when the authentication processing is normally completed, the information processing apparatus 300 and the mobile device 200 each become a data communicable state. As the authentication processing, for example, there can be exemplified confirmation of whether or not a software version, a data transfer mode, a protocol, and the like of the information processing apparatus 300 corresponds with those of the mobile device 200.

After that, one-to-one data communication between the information processing apparatus 300 and the mobile device 200 is performed. More specifically, the mobile device 200 transmits any data to the information processing apparatus 300 using the electric field coupler. Alternatively, any data is transmitted from the information processing apparatus 300 to the mobile device 200 using the electric field coupler. As the data, there may be exemplified music data such as music, a lecture, and a radio program, video data such as a film, a TV program, a video program, a photograph, a document, a picture, and a chart, a game, and software.

Here, while the radio wave emitted from an antenna of a radio frequency communication type attenuates in inverse proportion to the square of a distance, the intensity of the induction electric field generated from the electric field coupler is inversely proportional to the fourth power of a distance, and hence, it is advantageous in that the distance between a pair of devices which are communicable with each other using the electric field communication can be limited. That is, according to the electric field communication, there are obtained effects that degradation of a signal caused by an obstacle nearby is low, technology for preventing hacking and ensuring confidentiality can be simplified, and the like.

Further, the radio wave emitted from an antenna has a transverse wave component which oscillates in the travelling direction and the orthogonal direction of the radio wave, and there is a polarized wave. On the other hand, the electric field coupler has a longitudinal wave component which oscillates in the travelling direction, and generates an induction electric field with no polarized wave, and hence, it is also highly convenient in that the signal can be received at the receiving side when the surfaces of the pair of electric field couplers face each other.

Note that this specification places emphasis on an example in which a pair of communication devices performs short-range wireless communication (non-contact communication, TransferJet) utilizing an electric field coupler, but the embodiments of the present invention are not limited to such an example. For example, the pair of communication devices is also capable of performing the short-range wireless communication via a communication section rendered communicable using magnetic field coupling. According to the communication type using the electric field coupling or the magnetic field coupling, it is more advantageous than the radio frequency communication type in that an interference issue hardly arises because a signal is not transmitted when a communication partner does not come nearby.

Figure 2:
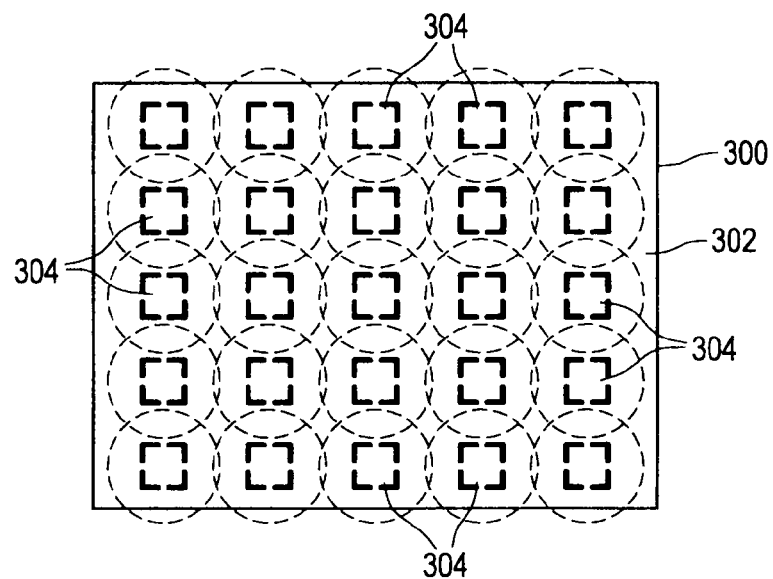
FIG. 2 is a schematic view showing an arrangement of electrode plates (antennas) provided to an information processing apparatus.

FIG. 2 is a schematic view showing an arrangement of electrode plates (antennas) 304 provided to the information processing apparatus 300. In the example shown in FIG. 2, multiple electrode plates 304 are provided on the back surface of the information processing apparatus 300. In this manner, by providing multiple electrode plates 304 on the whole region within the surface of the information processing apparatus 300 and setting a received signal strength to an appropriate value, a communication connection between the mobile device 200 and the information processing apparatus 300 can be established when the mobile device 200 is brought closer to the display section 302, which is the front side of the information processing apparatus 300.

Figure 3A:
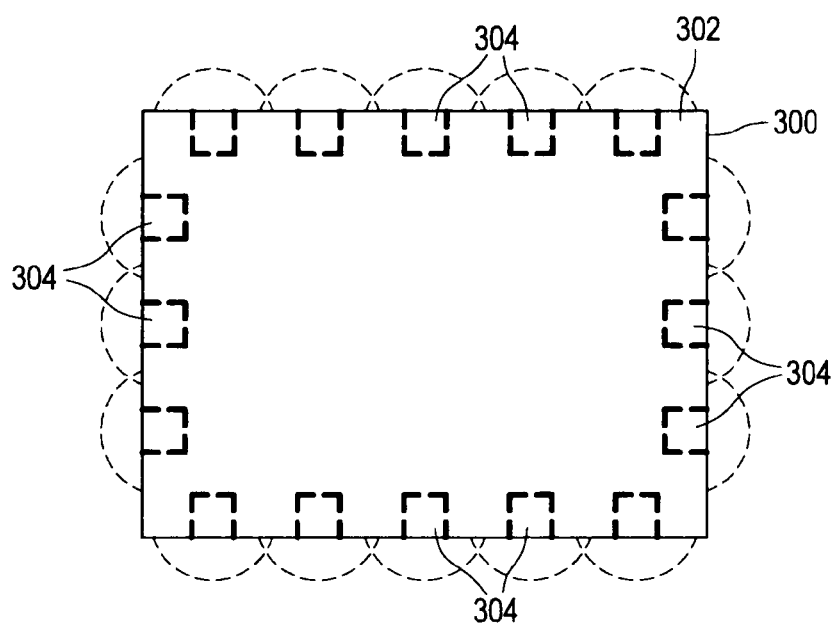
FIG. 3A is a schematic view showing an example of another arrangement of the electrode plates.
Figure 3B:
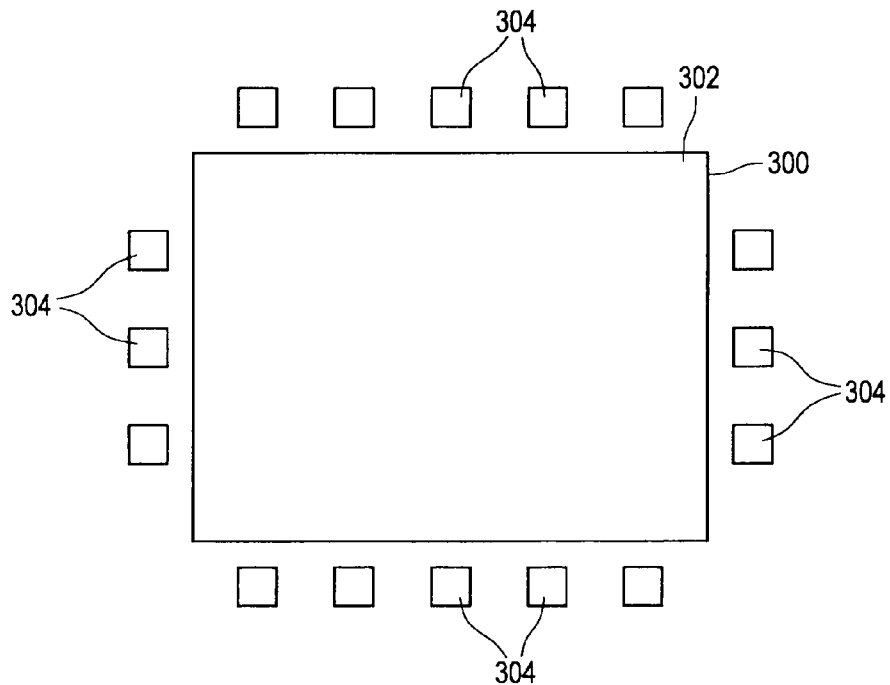
FIG. 3B is a schematic view showing an example of another arrangement of the electrode plates.

Further, FIGS. 3A and 3B are each a schematic view showing another example of arrangement of the electrode plates 304. In the example shown in FIG. 3A, multiple electrode plates 304 are arranged along the outline of the information processing apparatus 300. With such a configuration, when the mobile device 200 is brought closer to the side surface of the information processing apparatus 300, information held by the mobile device 200 can be transmitted to the information processing apparatus 300. Further, FIG. 3B is a schematic view showing another example of arrangement of the electrode plates 304. In the example shown in FIG. 3B, multiple electrode plates 304 are arranged, as antennas facing inside, along the outer outline of the display section 302. With such a configuration, even when the display section 302 is formed of a material that the radio wave is hard to pass through, information held by the mobile device 200 can be transmitted to the information processing apparatus 300 when the mobile device 200 is brought closer on the display section 302. As shown in FIG. 3B, in the case of arranging the electrode plates 304 at the edges of the display section 302, there can be provided a configuration in which a frame including a nonmetallic part for wireless communication is additionally provided such that the display section 302 is covered in a manner to be surrounded by the frame, and such that the electrode plates 304 are provided inside the frame, and hence, the communication can be performed without crossing a screen of the display section 302. Further, by heaping up the frame in a manner that the frame is convex with respect to the display surface of the display section 302, and by embedding the electrode plates 304 towards the inner side of the heaped part, it becomes possible to communicate with the mobile device placed on the display section 302. In this way, also with the configuration of FIG. 3B, it becomes possible to communicate with the mobile device placed on the display section 302. With the above configuration of the electrode plates 304, even when the display section 302 is formed of a material that the radio wave is hard to pass through, it is possible to communicate in the state where a component such as a liquid crystal is interposed, in the case where the electrode plates 304 are arranged on the back surface of the display section 302, by increasing the received signal strength.

Note that, since the mobile device 200 is relatively small in size, one electrode plate 204 is enough for the back side surface of the mobile device 200, but there may be provided multiple electrode plates 204.

Figure 4:
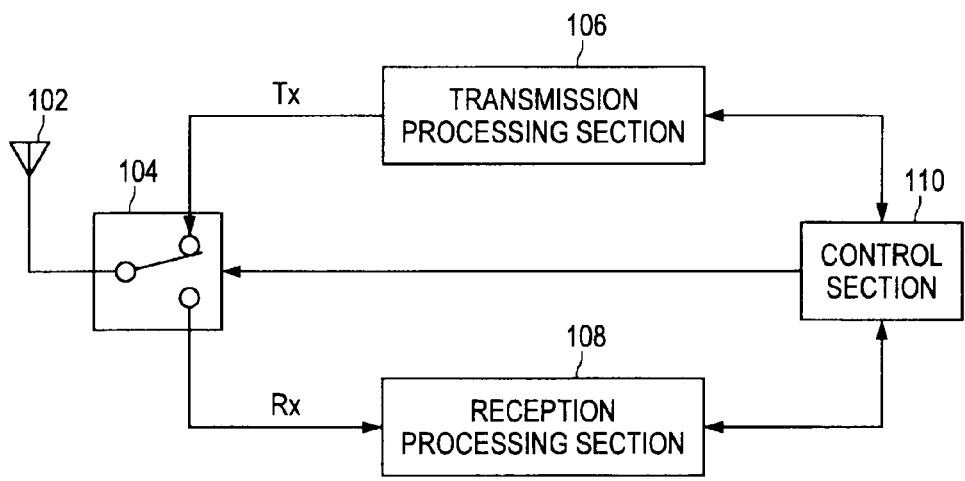
FIG. 4 is a schematic view illustrating a configuration of a communication device.

FIG. 4 is a schematic view illustrating a configuration of a communication section in the mobile device 200 and the information processing apparatus 300. The configuration shown in FIG. 4 is the same for both the mobile device 200 and the information processing apparatus 300.

As shown in FIG. 4, the mobile device 200 and the information processing apparatus 300 each have a transmission/reception coupler (communication section) 102, a selector 104, a transmission processing section 106, a reception processing section 108, and a control section 110. The transmission/reception coupler 102 is configured from an electric field coupler, and corresponds to the electrode plate 204, 304. The mobile device 200 and the information processing apparatus 300 communicates with each other by establishing an electric field coupling between the transmission/reception coupler 102 of the mobile device 200 and the transmission/reception coupler 102 of the information processing apparatus 300. The transmission/reception coupler 102 of the mobile device 200 and the transmission/reception coupler 102 of the information processing apparatus 300 are placed spaced apart from and facing each other in a short distance about 3 cm, for example, and capable of establishing an electrostatic coupling. The transmission/reception coupler 102 is connected selectively to one of the transmission processing section 106 and the reception processing section 108 via the selector 104.

The transmission processing section 106 generates a transmission signal for transmitting data from the transmission/reception coupler 102. The transmission processing section 106 includes components such as an encoder for encoding transmission data, a diffuser for diffusing the transmission data, a mapper for expanding the transmission data from binary series to a complex signal, and an RF circuit for performing upconversion to center frequency. Further, the reception processing section 108 decodes a reception signal received by the transmission/reception coupler 102. The reception processing section 108 includes components such as an RF circuit to which the reception signal is input, an A/D conversion section for converting the reception signal into a digital signal, a demapper for demapping the reception signal, and a decoder. When a transmission request is arisen from an upper level application, the transmission processing section 106 generates a high-frequency transmission signal such as a UWB signal based on the transmission data, and the signal is propagated from the transmission/reception coupler 102 to a communication partner device. A transmission/reception coupler 102 of the communication partner device demodulates and decodes the received high-frequency signal, and passes the reproduced data to the upper level application. The similar processing is performed also in the case where data is transmitted in the reverse direction between the mobile device 200 and the information processing apparatus 300. Therefore, two-way communication is realized between the mobile device 200 and the information processing apparatus 300.

For example, according to a communication type using high frequency and broadband, such as UWB communication, ultra high-speed data transmission at about several hundred Mbps can be realized within a short distance. Further, in the case where the UWB communication is performed not by radio wave communication but by electrostatic coupling, the received signal strength is inversely proportional to the fourth power of a distance, and hence, it is possible to render the received signal strength (intensity of radio wave) a weak radio wave, which does not necessitate a license of a radio station to be handled, by suppressing the received signal strength at a distance of three meters from radio equipment to a predetermined level or lower, and there can be configured a communication system at a low price. Further, in the case of performing data communication at ultra-short distance by an electrostatic coupling type, the quality of the signal is not deteriorated due to a reflection object that is present in the vicinity thereof, hacking on the transmission path can be reliably prevented, and confidentiality can be ensured. Further, by suppressing the received signal strength to a predetermined lever or lower, and, for example, by enabling the communication only within a distance of 3 cm or less, it becomes possible to obtain a configuration such that two devices cannot communicate at the same time with one device, and hence to realize one-to-one communication within a short distance.

The control section 110 controls entire operation of the mobile device 200 or the information processing apparatus 300. For example, the control section 110 controls generation of a transmission signal by the transmission processing section 106, and controls decoding of a reception signal by the reception processing section 108. Further, when the control section 110 transmits a connection request frame, a data file, and the like to a device of a communication partner, the control section 110 outputs a switching signal to the selector 104, and causes the connection between the transmission/reception coupler 102 and the transmission processing section 106 to be established. Further, when the control section 110 receives the connection request frame, the data file, and the like from the device of a communication partner, the control section 110 outputs a switching signal to the selector 104, and causes the connection between the transmission/reception coupler 102 and the reception processing section 108 to be established.

The establishment of the connection is realized as follows: one device (initiator) transmits a connection request frame to another device (responder); and the initiator receives a connection response frame transmitted from the responder. The connection request frame is transmitted from the device, into which a user action such as data file transferring or data file selection is input, to the communication partner.

Figure 5:
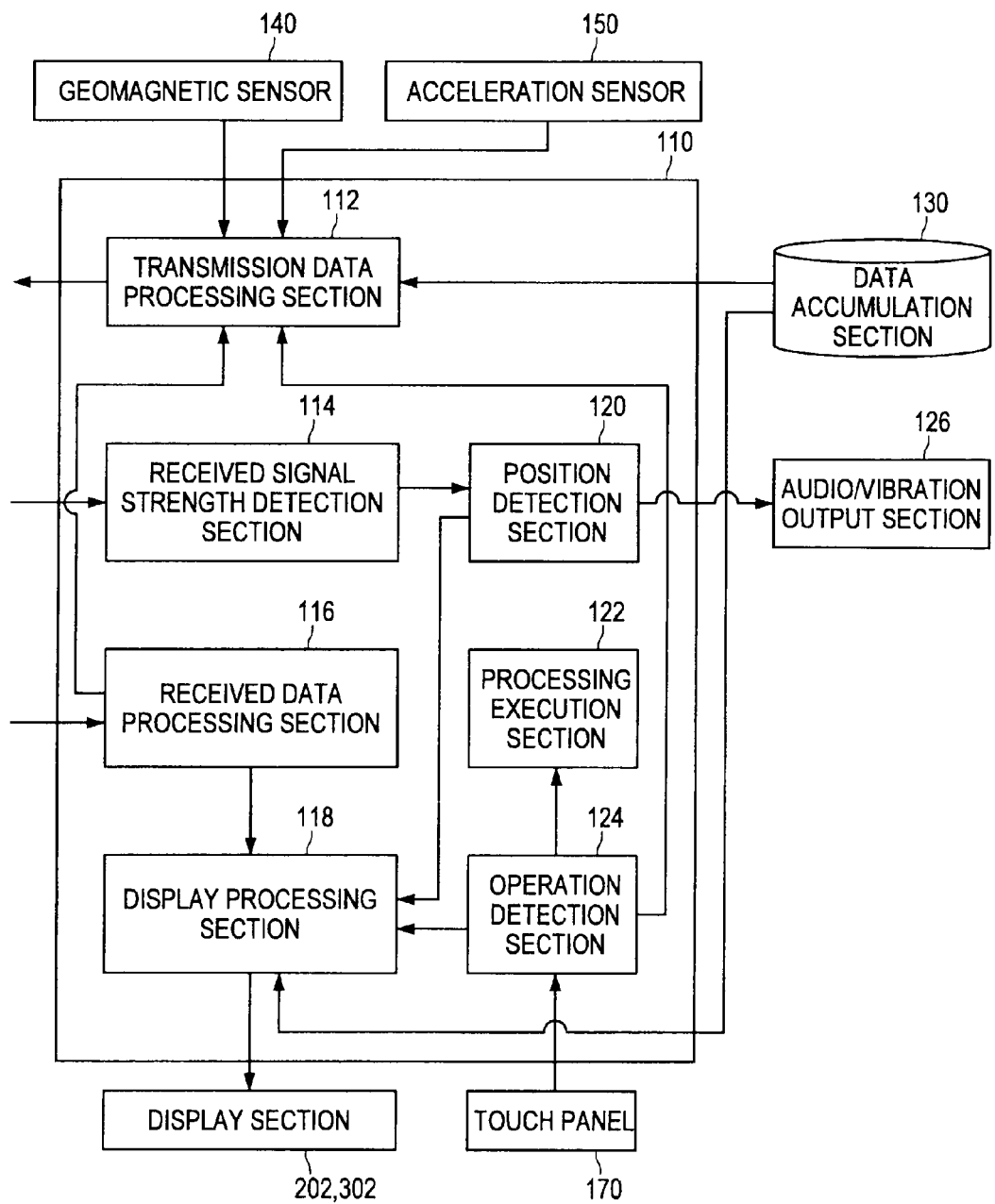
FIG. 5 is a block diagram showing a functional configuration of the surrounding of a control section of a mobile device or the information processing apparatus.

FIG. 5 is a block diagram showing a functional configuration of the surrounding of the control section 110 of the mobile device 200 or the information processing apparatus 300. The configuration shown in FIG. 5 is the same for both the mobile device 200 and the information processing apparatus 300. As shown in FIG. 5, the control section 110 is configured to have a transmission data processing section 112, a received signal strength (electric field intensity) detection section 114, a received data processing section 116, a display processing section 118, a position detection section 120, a processing execution section 122, an operation detection section 124, and an audio/vibration output section 126.

Further, the mobile device 200 or the information processing apparatus 300 is configured to have a data accumulation section 130, a geomagnetic sensor 140, an acceleration sensor 150, a display section 202, 302, and a touch panel (touch sensor) 170. Note that the information processing apparatus 300 may not include the geomagnetic sensor 140 and the acceleration sensor 150.

The functional blocks shown in FIGS. 4 and 5 can be each configured to have hardware (sensor, circuit, and memory), or a processing unit (CPU) and software (program) for causing the processing unit to function. In the case where those functional blocks are each configured from the processing unit and the software, the program can be stored in a recording medium such as a memory included in the mobile device 200 or the information processing apparatus 300.

With the configuration described above, in the case where the mobile device 200 and the information processing apparatus 300 placed in proximity to each other transmit/receive data to/from each other, the mobile device 200 and the information processing apparatus 300 perform various displays on the display section 202 and the display section 302, respectively, as user interfaces (UI's). Hereinafter, the contents of those displays will be described in detail. Note that, although the display section 302 of the information processing apparatus 300 in FIG. 1 is provided in a manner to extend in a vertical direction, the display section 302 may also be provided in a state of facing upward. That is, in the case where the information processing apparatus 300 is configured from a thin-type display panel, the display section 302 may be placed on a table in a state of facing upward. In this case, a wireless communication connection can be established by placing the mobile device 200 on the display section 302.

In each embodiment that will be described below, in the case where the mobile device 200 and the information processing apparatus 300 wirelessly communicate with each other, there can be realized user-friendly devices such that a user can perform operation while intuitively recognizing the processing by performing a predetermined display on the display section 202, 302 as the user interface (UI). Note that, the configuration described above is the same for each embodiment.

In the first embodiment, there will be described a reaction in the case where the mobile device 200 is placed on the display section 302 of the information processing apparatus 300 or in the case where the mobile device 200 is placed on the side surface of the information processing apparatus 300. Here, there is mainly described the case of placing the display section 302 facing upward. Since the display section 302 of the information processing apparatus 300 is sufficiently larger than the mobile device 200, transmission and reception of data can be performed between the mobile device 200 and the information processing apparatus 300 by placing, by the user, the mobile device 200 on the display section 302.

Figure 6:
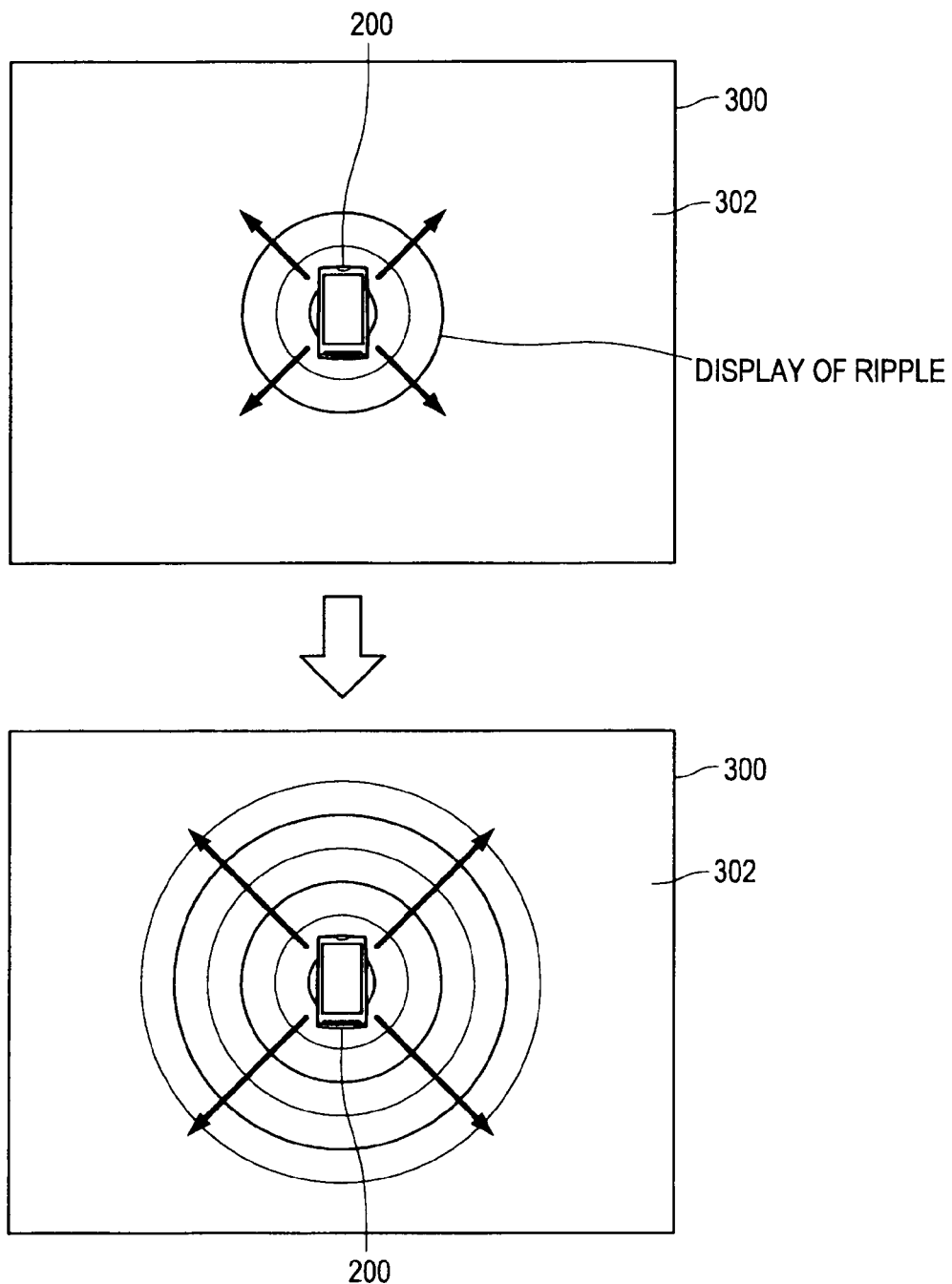
FIG. 6 is a schematic view showing a state where a UI like a wave (ripple) is displayed around the mobile device on a display section.

In the example shown in FIG. 6, when the communication connection between the mobile device 200 and the information processing apparatus 300 is established, a UI like a wave (ripple) is displayed around the mobile device 200 on the display section 302. The wave displayed on the display section 302 in a manner as to be gradually propagated outward with the position of the mobile device 200 as the center. The state of the wave is changed depending on holding data amount, radio sensitivity, data transfer phase, and the like of the mobile device 200. Those pieces of information are acquired by the received data processing section 116 of the information processing apparatus 300. The display processing section 118 of the information processing apparatus 300 executes processing of performing display as will be described in each embodiment below based on the information detected by the received data processing section 116. Accordingly, the user can intuitively recognize various types of data such as the holding data amount only by looking at the state of the wave.

Next, there will be described technology necessary for realizing the UI described above and a method of realizing the UI. In the case of the configuration shown in FIG. 6, the position of the mobile device 200 on the display section 302 can be specified based on a received signal strength of each of multiple electrode plates 304 included in the information processing apparatus 300, and, for example, in the case where a received signal strength at a specific electrode plate 304 is higher than a received signal strength at another electrode plate 304, then it is determined that the mobile device 200 is positioned in the vicinity of the specific electrode plate 304. Further, in the case where a touch panel 170 is provided on the display section 302, the position of the mobile device 200 on the display section 302 can also be specified based on the output of the touch panel 170. In this case, it is preferable to use a pressure-sensitive type touch panel as the touch panel.

Further, the detection that the mobile device 200 is held over the information processing apparatus 300 is performed by establishment of a wireless connection owing to an approach of the mobile device 200 to the information processing apparatus 300. First, when a connection request frame is transmitted from the transmission data processing section 112 of one device (initiator) to another device (responder), the connection request frame is received by the received data processing section 116 of the responder. Then, the transmission data processing section 112 of the responder transmits a connection response frame, and the received data processing section 116 of the initiator receives the connection response frame. Thus, the wireless connection between the mobile device 200 and the information processing apparatus 300 is established.

The identification of the mobile device 200 and the information processing apparatus 300 is performed by exchanging identification information (ID) therebetween, after the connection is established. In the data accumulation section 130 of the mobile device 200 or the information processing apparatus 300, there is stored identification information. The identification information is read out from the data accumulation section 130, and is transmitted to a connection destination by the transmission data processing section 112. The identification information may be, in addition to device information for identifying the kind of device of the mobile device 200 or the information processing apparatus 300, information including personal information of a user with the device information.

The received signal strength can be acquired by an RSSI (Received Signal Strength Indicator). In the case of Transfer-Jet, it is standard to acquire the RSSI at the time of communication. The received signal strength is detected by the received signal strength (electric field intensity) detection section 114 shown in FIG. 5.

Pieces of information such as a stored data amount and a type of data are acquired by a search or a reference to an index after the establishment of the wireless connection. For example, the information processing apparatus 300 acquires those pieces of information by searching for information such as content and an application held by the mobile device 200 after the establishment of the wireless connection. Further, the mobile device 200 can cause the information processing apparatus 300 to acquire those pieces of information by transmitting the index of information such as content and an application to the information processing apparatus 300 after the establishment of the wireless connection. Further, it is also possible that the mobile device 200 performs the search and the information processing apparatus 300 transmits the index. In the same manner, data capacity is acquired by a search or a reference to an index after the establishment of the wireless connection. Pieces of information such as content and an application held by the mobile device 200 are transmitted from the transmission data processing section 112 and received by the received data processing section 116.

The behavior of the UI to be realized is as follows. The position detection section 120 detects the position of the mobile device 200 on the display section 302 or in the periphery of the display section 302 depending on a detection result of a received signal strength obtained by the received signal strength (electric field intensity) detection section 114. The display processing section 118 performs display processing in a manner that the ripple UI moves with a position at which the mobile device 200 is held over as the center. Thus, the ripple that spreads outward with the mobile device 200 as the center is displayed on the display section 302. In this case, the display processing section 118 provides the user with an easy-to-understand UI by changing the behavior of the wave (UI) depending on a device type, a received signal strength, a data type, data capacity, and the like, which are received by the received data processing section 116.

For example, as the signal strength is higher, the wave is displayed such that an amplitude or a frequency of the wave becomes larger. Accordingly, the user can visually determine whether or not the received signal strength is high only by looking at the wave displayed on the display section 302. Further, by setting in advance a shape, a color, an amplitude, a frequency, and the like of the wave associated with a device type or a data type, the user can visually recognize those pieces of information only by looking at the wave displayed on the display section 302.

Figure 7:
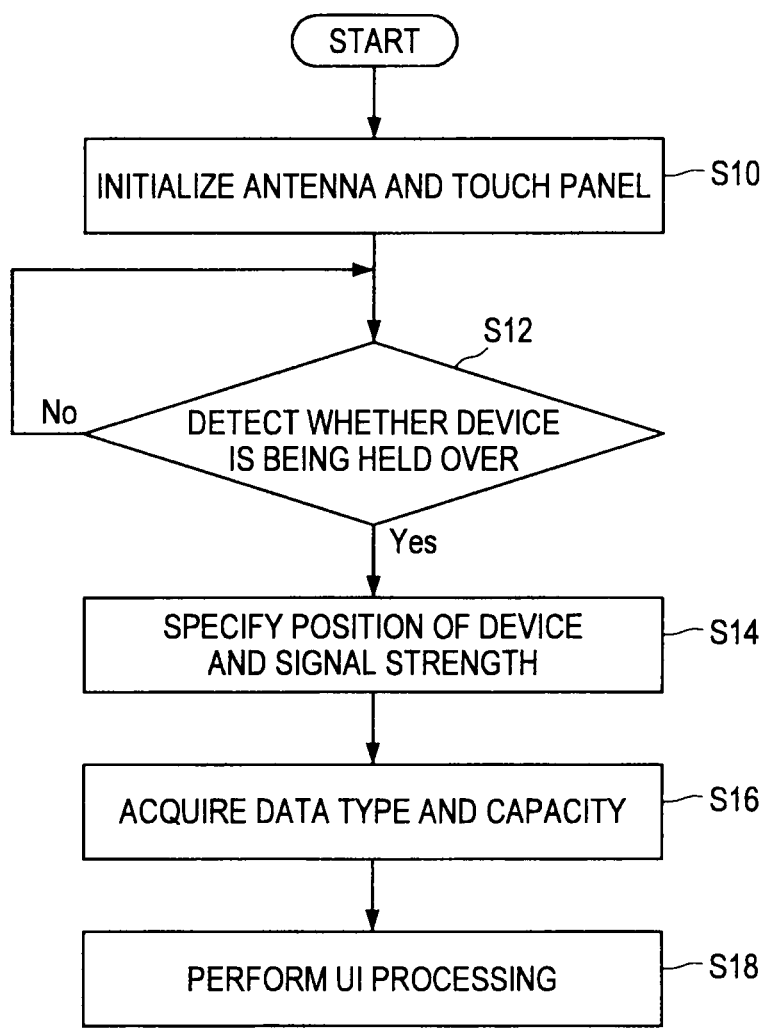
FIG. 7 is a flowchart showing a processing procedure in the information processing apparatus.

FIG. 7 is a flowchart showing a processing procedure in the information processing apparatus 300. First, in Step S10, the electrode plate (antenna) 204, 304 and the touch panel 170 are initialized. In Step S12 that follows, it is detected whether the mobile device 200 is held over the information processing apparatus 300, and in the case where the mobile device 200 is held over the information processing apparatus 300, the procedure proceeds to Step S14. On the other hand, in the case where the mobile device 200 is not held over the information processing apparatus 300, the procedure waits at Step S12.

In Step S14, the position of the mobile device 200 and the received signal strength are specified. In Step S16 that follows, various types of information such as the data type and capacity are acquired by a search or a reference to an index after the establishment of the wireless connection. Next, in Step S18, UI processing is performed, and the processing of displaying on the display section 302 the wave in a varying manner depending on the received signal strength is performed, for example.

In Step S18, there is performed, as an example, processing of changing sound and color of the wave depending on the type of the mobile device 200. Further, there is performed processing of changing the amplitude and the frequency of the ripple depending on the received signal strength. Still further, there is performed processing of changing the sound and color of the wave depending on the data type. In addition, there is performed processing of changing the sound, color, and frequency of the wave depending on the data capacity. Here, the data capacity may be data amount of content such as a photograph and a moving image that are held by the mobile device 200. Note that the processing procedure in each embodiment which will be described below is performed in the same manner as in FIG. 7.

Further, the UI to be displayed on the display section 302 is not necessarily limited to the ripple, and may be, for example, a UI which reads out a name of a connected device using specific voice depending on the type of the device, for example. In this case, there may be used a voice which is used in a commercial for advertising the connected mobile device 200.

Further, as for the received signal strength, there can be performed display processing in a manner that, when the mobile device 200 comes closer to a target displayed on the display section 302 of the information processing apparatus 300, the target is enlarged in accordance with the increase of the received signal strength. The similar processing can be also expressed with voice, and there can be performed processing in a manner that the volume of the voice is turned up as the mobile device 200 comes nearer.

Figure 8A:
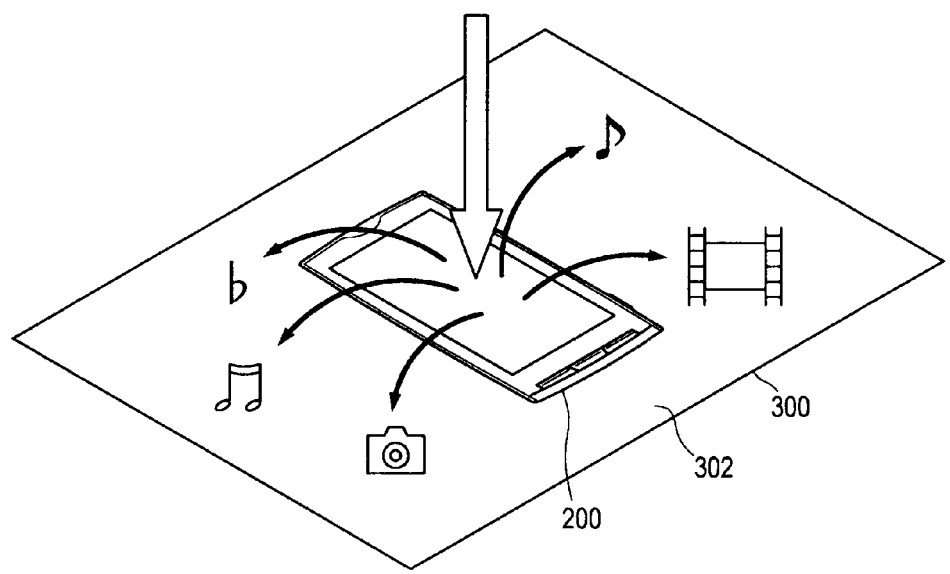
FIG. 8A is a schematic view showing an example of displaying, when the mobile device is put down, pieces of content in a manner to be scattered around as if they pop out.

FIG. 8A is a schematic view showing an example of displaying, when the mobile device 200 is put down, pieces of content in a manner to be scattered around as if they pop out. As shown in FIG. 8A, types of data can be displayed in a manner that, after the mobile device 200 is held over, icons corresponding to the types of data, respectively, pop out from the center of the mobile device 200. In this case, there are performed the following display processing, for example: in the case of music content, a musical note pops out; and in the case of photograph content, a photograph is pops out. In this case, it can be made visually more effective by displaying the content in 3D.

Figure 8B:
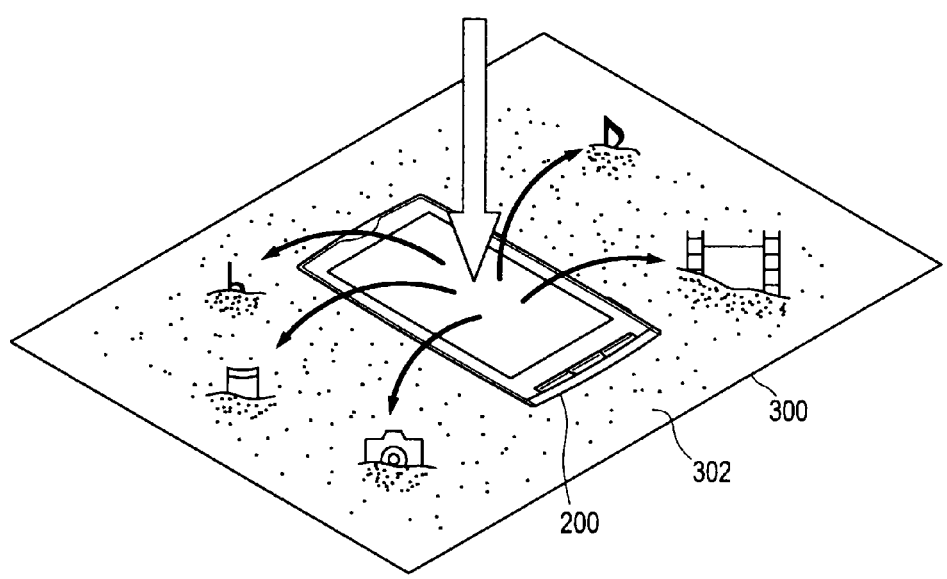
FIG. 8B is a schematic view showing a state where there is displayed on the display section a UI falling on sand and getting buried in the sand around the mobile device.

FIG. 8B is a schematic view showing a state where there is displayed on the display section a UI falling on sand and getting buried in the sand around the mobile device 200. As shown in FIG. 8B, the display section 302 is likened to a golf bunker, and pieces of content are displayed in a manner to be scattered around, just like that balls fall on the bunker and the sand splashes. As for the data capacity transfer, the display section 302 is likened to a golf bunker, and the pieces of content scattered around the mobile device 200 are displayed in a manner to get sunk in the sand, just like that balls fall on the bunker and the balls sink in the sand. In addition, the display is performed such that how far the content sinks changes depending on the amount of the data. In the same manner, the UI may be displayed with the display section 302 being likened to a cushion. In this case, the UI may be displayed in a manner that, by changing the amount of bouncing depending on the data amount of the content, the bouncing amount becomes larger as the data amount becomes larger.

Next, there will be described the case where the mobile device 200 is held on the side of the display section 302 (display) of the information processing apparatus 300. This can be applied for the case where, as described in FIG. 3, electrode plates 304 are provided along the periphery of the display section 302.

Figure 9:
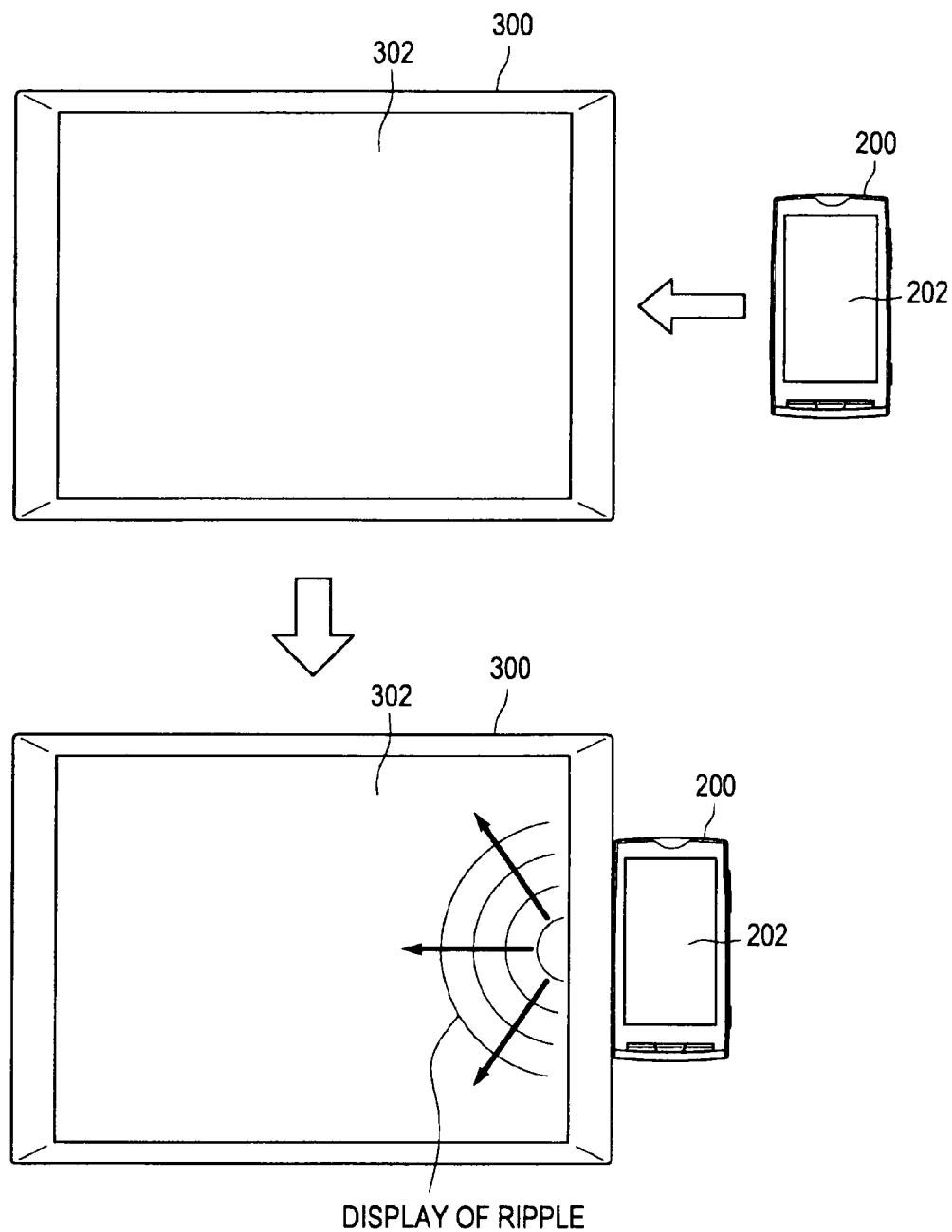
FIG. 9 is a schematic view showing an example of bringing the mobile device closer to a side surface of an information processing apparatus 300.

As shown in FIG. 9, when the mobile device 200 comes closer to a side surface of the information processing apparatus 300, a wireless communication connection is established between the mobile device 200 and the electrode plates 304 provided along the periphery of the information processing apparatus 300. In this case, there is performed processing of displaying a semicircular ripple with a position at which the mobile device 200 is held as the center. Further, an icon corresponding to the type of the mobile device 200 and the like can also be displayed at the center of the wave or at the vicinity thereof. Accordingly, the user can confirm whether the mobile device 200 that has been held close to the information processing apparatus 300 is correctly recognized by the information processing apparatus 300. Processing other than the above processing can be performed in the same manner as the example of FIG. 6, and the amplitude, the frequency, the color, and the like of the ripple can be changed depending on the received signal strength, the data type, the data capacity, and the like.

Figure 10:
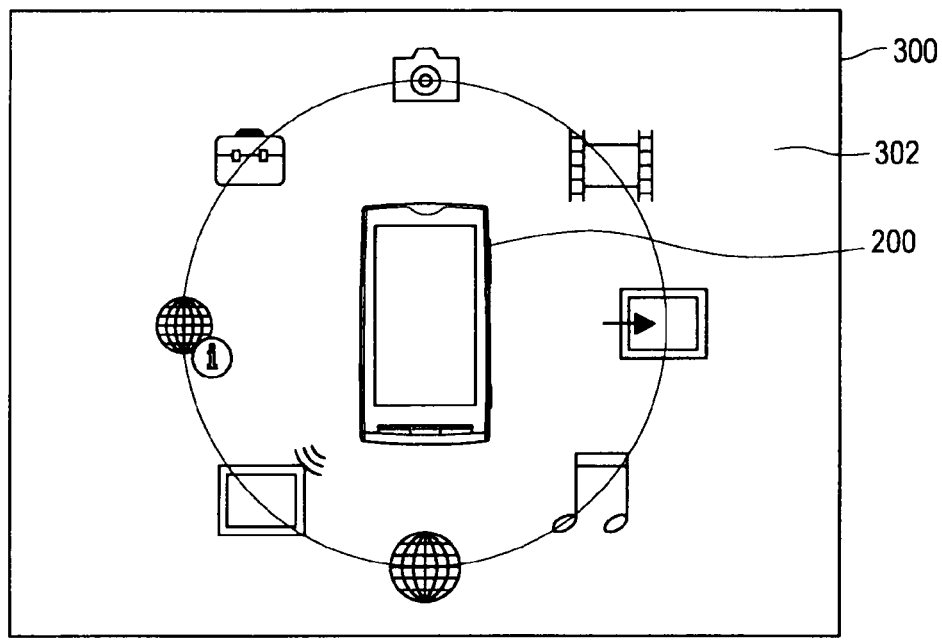
FIG. 10 is a schematic view showing a state where, in the case where the mobile device is placed on a display section of the information processing apparatus, content or a menu is displayed.

Next, a description will be given of a configuration of performing content display and menu display in the case where the mobile device 200 is placed on the display section 302. FIG. 10 is a schematic view showing a state where, in the case where the mobile device 200 is placed on the display section 302 of the information processing apparatus 300, content or a menu transmitted from the mobile device 200 is displayed. As shown in FIG. 10, the mobile device 200 and the information processing apparatus 300 communicate with each other, and the content or the menu is displayed in the vicinity of the mobile device 200. In the example shown in FIG. 10, there is shown a state where pieces of content held by the mobile device 200 are displayed on the circumference on the display section 302 with the mobile device 200 as the center. With such a display, the user can perform processing of opening the content or the like by operating the icon of the content displayed on the display section 302. In this case, an output of the touch panel 170 is transmitted to the operation detection section 124, and then the processing of displaying the content opened by the display processing section 118 is performed. Further, an output of the operation detection section 124 is transmitted to the processing execution section 122, and then the processing of opening the content is executed.

For example, when the user operates a "camera" icon displayed on the display section 302, the touch panel 170 of the information processing apparatus 300 detects the operation and displays photograph data as content. In this way, the photograph data held by the mobile device 200 can be displayed on the display section 302.

Hereinafter, there will be described technology necessary for realizing the UI shown in FIG. 10 and a method of realizing the UI. "The specification of the position of the mobile device 200", "the detection of being held over", and "the establishment of the wireless connection" are performed in the same manner as the example of the ripple described above. In addition thereto, in the UI shown in FIG. 10, when identifying the mobile device 200, the information processing apparatus 300 acquires information indicating the size of the mobile device 200 and also acquires information of specifying the direction of the mobile device 200. Since the information of the size of the mobile device 200 is acquired, an icon can be displayed on the outer region of the mobile device 200. Further, the information of specifying the direction of the mobile device 200 is acquired for orienting the direction of displaying the icon toward the direction of the mobile device 200. In the case of specifying the direction of the mobile device 200, the shape of the mobile device 200 is detected by the touch panel 170 of the information processing apparatus 300, and the direction is specified based on the shape. Further, information on the direction of the mobile device 200 which is obtained from the geomagnetic sensor 140 of the mobile device 200 can also be transmitted to the information processing apparatus 300.

Note that the configuration above is applicable to the case of placing the mobile device 200 on the display section 302 and to the case of placing the mobile device 200 on the side surface of the display section 302, and the position to place the mobile device 200 is not limited.

As shown in FIG. 10, the menu screen of the information processing apparatus 300 displays icons indicating the functions of the mobile device 200 on the circumference of a concentric circle having the mobile device 200 as the center. In the case where the mobile device 200 is placed on the side surface of the information processing apparatus 300, the icons are displayed on the circumference of a semicircle having the mobile device 200 as the center.

The processing of the information processing apparatus 300 in the example of FIG. 10 is the same as that of FIG. 7. In the example of FIG. 10, in Step S16, there are acquired information of content, information of a size of the mobile device 200, and information of a direction of the mobile device 200, in addition to the information such as data type. Then, in Step S18, the content display and the menu display are performed taking into consideration the size and the direction of the mobile device 200.

Figure 11:
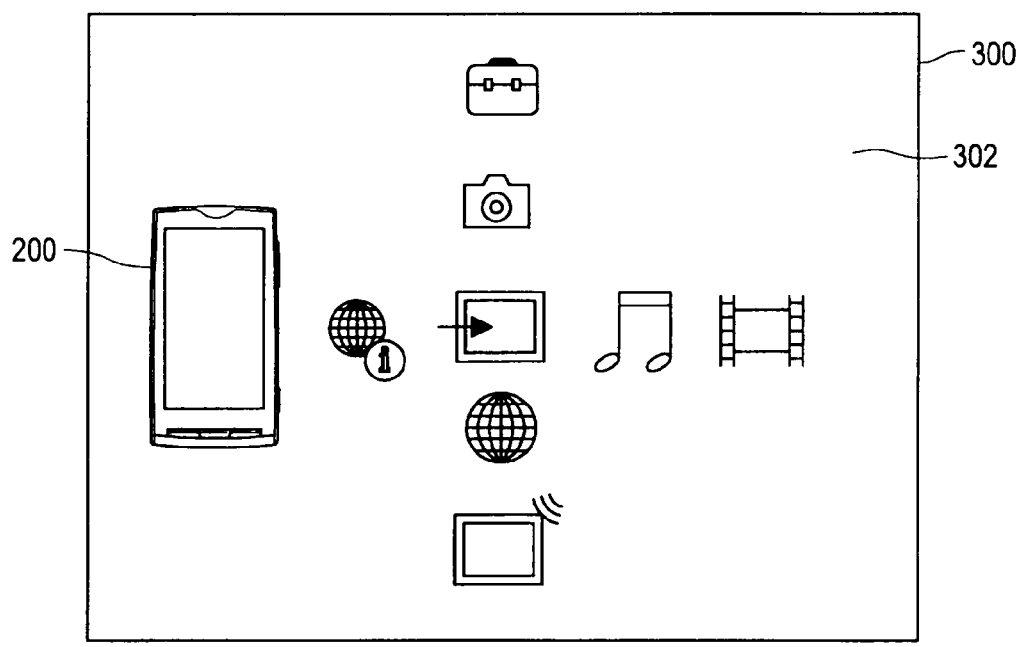
FIG. 11 shows an example of displaying, in the case where a connection with a mobile device is established, content held by the mobile device as an item of a cross media bar (XMB)

FIGS. 11 to 17 show variations of FIG. 10. FIG. 11 shows an example of displaying, in the case where a connection with the mobile device 200 is established, content held by the mobile device 200 as an item of a cross media bar (XMB: registered trademark). In this case, when selecting one of the icons arranged in the lateral direction, then icons of the content related to the selected icon are displayed in the vertical direction. Accordingly, when a functional icon is selected, the corresponding content can be caused to be displayed.

Figure 12:
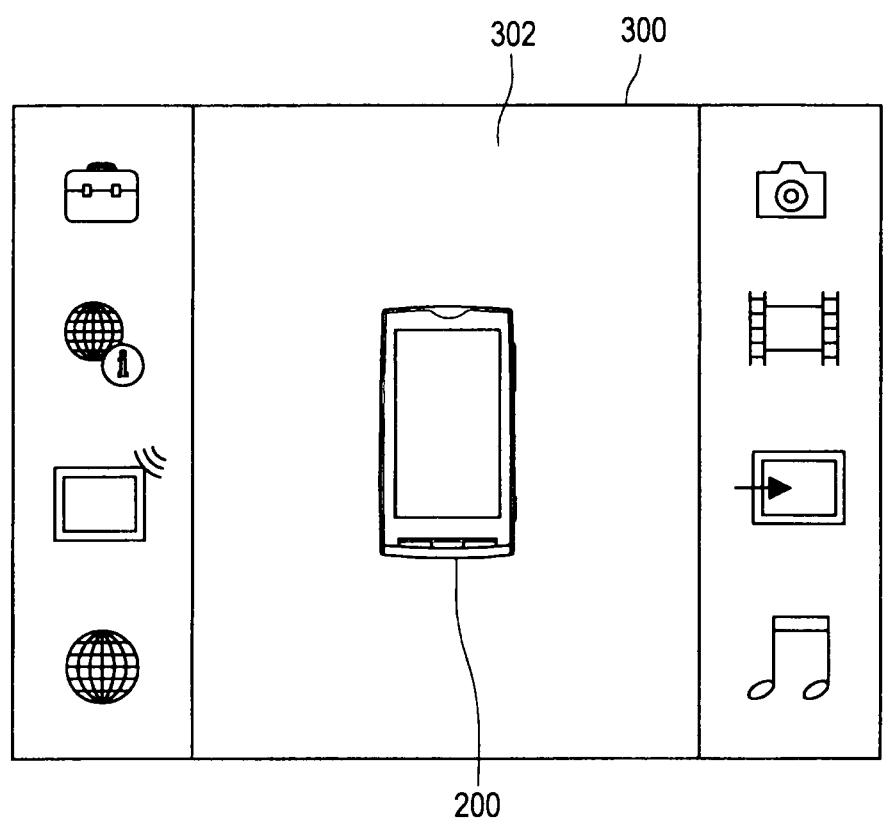
FIG. 12 is a schematic view showing an example of displaying information of content by separating the information into left and right sides of the display section.

FIG. 12 shows an example of displaying information of content by separating the information into left and right sides of the display section 302. Further, FIG. 13 shows an example of, when the connection with the mobile device 200 is established in a state where the icons of the content related to the information processing apparatus 300 are displayed on the display section 302, a functional icon which is not available among the functional icons grays out and a functional icon which is available among the functional icons is displayed brightly depending on the function of the mobile device 200. Further, when the mobile device 200 is held over, it may be set in the following manner: a functional icon which is not available among the functional icons is hidden; and a functional icon which is available among the functional icons is displayed. In this case, in the case of displaying a functional icon, animation may be displayed. Further, a recommended functional icon may be displayed in an appealing manner.

FIG. 14 is a schematic view showing a case where the mobile device 200 is brought closer to the left side surface of the information processing apparatus 300. In the example shown in FIG. 14, an available icon is moved in the vicinity of the mobile device 200. In this way, when the mobile device 200 is held over, a functional icon which is available among the functional icons may be moved in a manner to be attracted to the mobile device 200. In this case, a functional icon which is unavailable may gray out or may be hidden. In such a case, information related to the size and direction of the mobile device 200 is acquired, and the icon is displayed such that the icon is not overlapped with the mobile device 200. Further, by matching a moving direction of the icon with a transfer direction of data, it may be set in such a manner that a flow of the data can be visually recognized. Still further, icons which relate with each other may be displayed in a manner that the icons merge into each other. In addition, as for an icon which moves in a wrong direction, the icon can be moved in a correct direction by operation of the touch panel 170. With the spread of mobile devices 200, there are produced mobile devices 200 having various types of content and applications in present conditions. According to the present embodiment, it is possible to show the user in an easy-to-understand way what can be done and what cannot be done by the mobile device 200 only by placing the mobile device 200 on a large-sized display, and hence, the convenience of users including the users who are unfamiliar with the handling of the mobile device 200 can be enhanced.

Figure 15:
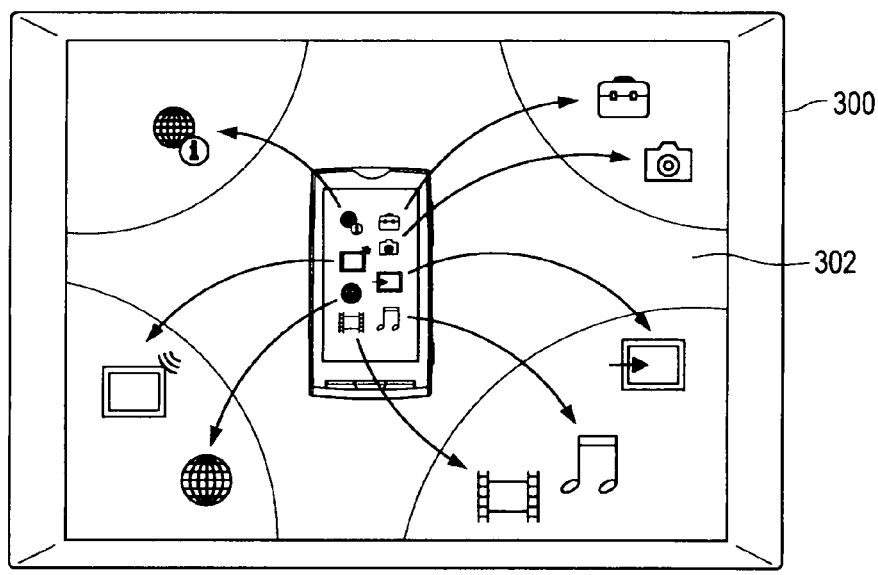
FIG. 15 is a schematic view showing an example in which pieces of content of the mobile device move to four corners on the display section.

FIG. 15 shows an example in which pieces of content of the mobile device 200 move to four corners on the display section 302 depending on types of content. In this way, the icons of content may be gathered in different places depending on the type of content. The received data processing section 116 of the information processing apparatus 300 acquires identification information of information received from the mobile device 200, and display processing depending on the type of content can be performed by the display processing section 118. Thus, many types of pieces of content can be classified in an orderly manner and displayed. Further, it is also possible to allow the user to look for content of a function that the user wants by moving content by operating the touch panel 170.

Figure 16:
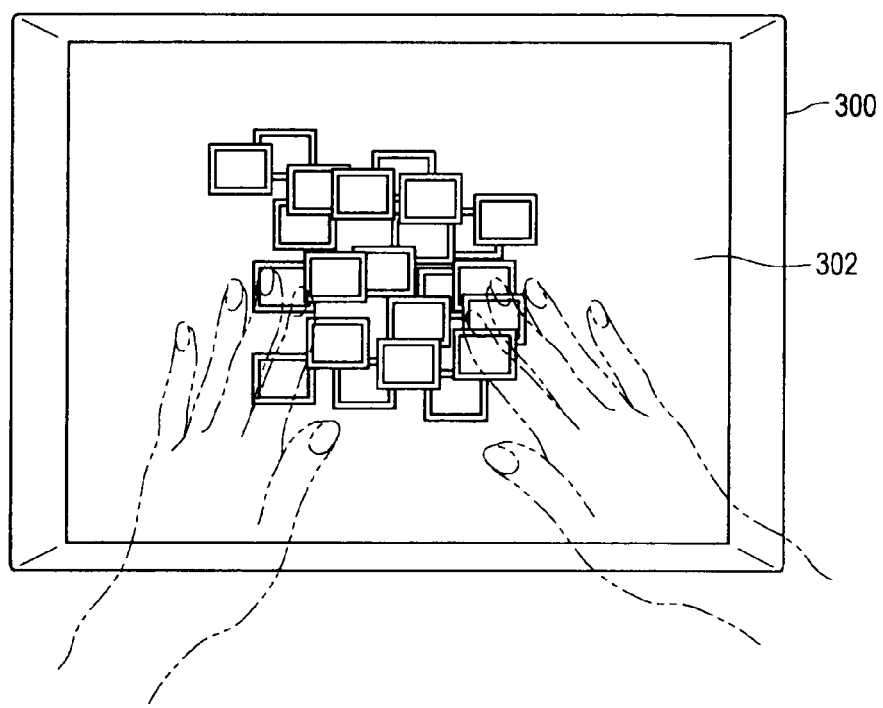
FIG. 16 is a schematic view showing a state of looking for content by feeling with hands pieces of content overflowed from the mobile device onto the display section.

FIG. 16 shows a state where pieces of content are overflowed from the mobile device 200 onto the display section 302 by holding the mobile device 200 over the information processing apparatus 300, and the pieces of content are felt with hands for looking for content. When the operation of the touch panel 170 performed by the user is detected by the operation detection section 124, the state in which the content is moved in response to the operation can be displayed. In this way, the operation of finding the desired content can be performed by randomly displaying pieces of content in an overlapping manner and moving the pieces of contents by hands.

In the display method shown in FIG. 16, there may be performed 3D display, and overlapped pieces of content may be operated by 3D operation. In this case, the state of the pieces of content being overlapped with each other can be displayed more realistically.

According to the operation shown in FIG. 16, in the case where the content is "photograph", for example, it becomes possible, in the state where as if photographs are scattered about on the display section 302, to find a desired photograph or align the photographs. Therefore, it becomes possible to find the desired content from among randomly placed pieces of content by moving the pieces of content with hands by the operation of the touch panel 170. In this case, it is also possible to preferentially display the content whose number of reproduction times is high or the content whose number of reproduction times is low.

Figure 17:
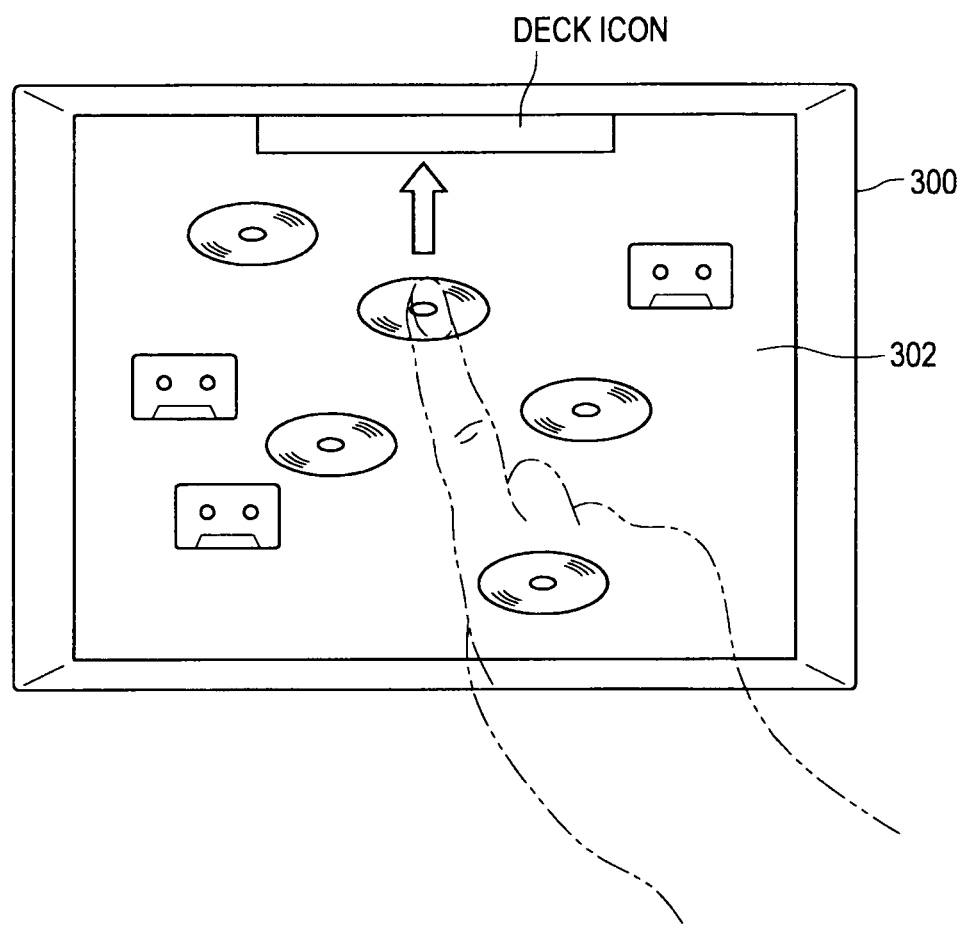
FIG. 17 is a schematic view showing a state where a UI represented by an icon which is a picture of a compact disc (CD) or an audio tape and a UI which is a picture of a player.

FIG. 17 is a schematic view showing another operation of content. In the example shown in FIG. 17, there are displayed a UI represented by an icon which is a picture of a compact disc (CD) or an audio tape and a UI which is a picture of a player. When the user operates the touch panel 170 and places the icon of CD on top of the icon of the player, the selected CD is reproduced by the processing execution section 122.

As means for creating a playlist, there is a technique of arranging pieces of content (CD and audio tape in the example of FIG. 17) in an order of a list or attaching a number to each piece of content, thereby enabling to set data indicating the number from the top of the playlist for each piece of content. Accordingly, even when compact discs (CDs) are randomly thrown into the player, the CDs can be reproduced in a correct order. In general, since a PC that is larger in size is provided with a good audio/video reproduction device, the content on the mobile device 200 can be watched and listened to by a better reproduction device while visually confirming and selecting the content on a large-sized display (display section 302).

Next, as for the method of acquiring icon data, there can be exemplified a method of preparing options in advance and a method of displaying icons of related functions obtained by searching a terminal, but the method is not limited thereto.

As a practical application for transferring the processing of the mobile device 200 to the information processing apparatus 300, a state of the mobile device 200 is acquired by the information processing apparatus 300 and the rest is reproduced in the information processing apparatus 300. When the mobile device 200 is held over the information processing apparatus 300, (the rest of) the content which has been reproduced in the mobile device 200 is reproduced in the information processing apparatus 300. Further, an image and the like may be transmitted from a screen under operation of another information processing apparatus 300.

Next, there will be described an example of moving content, a functional icon, and the like on the information processing apparatus 300 which are already displayed on the display section 302 when the mobile device 200 is held over the information processing apparatus 300. In the example shown in FIG. 18, in the case where a window W of content is displayed on almost the whole surface of the display section 302, when the mobile device 200 is placed on the display section 302, the window W moves (reduces) in a manner to keep away from the mobile device 200. In this case, the window W is resized depending on the size of the mobile device 200. Accordingly, the mobile device 200 and the window W are not overlapped with each other, and the user can continuously visually recognize the entire display of window W.

Figure 18:
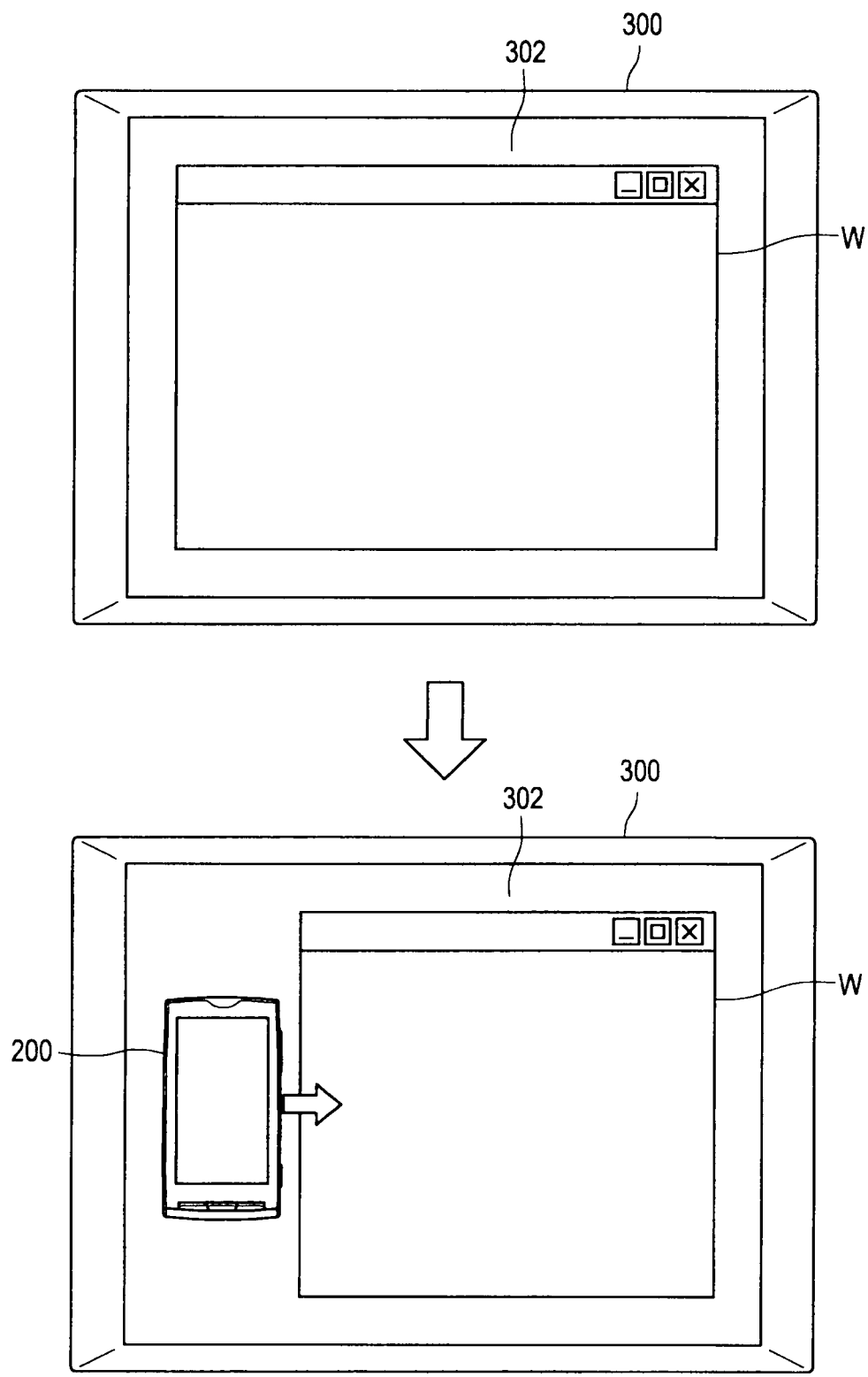
FIG. 18 is a schematic view showing an example in which a window W moves (reduces) in a manner to keep away from the mobile device.

FIG. 19 is a schematic view showing an example in which an icon moves in a manner to keep away from the mobile device 200 when the mobile device 200 is placed on the icon which is already being displayed. By moving the icon displayed underneath the mobile device 200 to a position at which the icon can be easily seen, the mobile device 200 and the icon can be avoided from being overlapped with each other. Then, with the operation of the touch panel 170, it becomes possible to arrange related icons in an easy-to-use manner. In the examples shown in FIGS. 18 and 19, after the connection establishment, the display processing section 118 performs processing of moving a window or an icon to a position which does not overlaps with the mobile device 200 by acquiring a position, a size, and a direction of the mobile device 200. It is convenient in that the user can easily place the mobile device 200 on the display section 302 for displaying a menu or the like without worrying about the position of the window. As shown in FIG. 18, in the case where the mobile device 200 is released from the display section 302, the window W may be returned to the size before the mobile device 200 is placed on the display section 302. In the same manner, as shown in FIG. 19, icons which overlap with the mobile device 200 are moved or deleted, and after that, when the mobile device 200 is released from the display section 302, the icons may be moved again or displayed again at the original positions.

Further, when the mobile device 200 is rotated, the menu displayed on the display section 302 is rotated in a manner to follow that direction. For example, in the case where there is a user other than the user operating the mobile device 200, a menu that is directed toward the user operating the mobile device 200 is directed to the other user by rotating the mobile device 200. Accordingly, the direction of the display can be changed such that it is easily viewable for the other user. Since the mobile device 200 (physical target) can be directly touched and, with the touched part as an origin, the menu on the display can be operated, it becomes possible to perform an intuitive operation.

Figure 20:
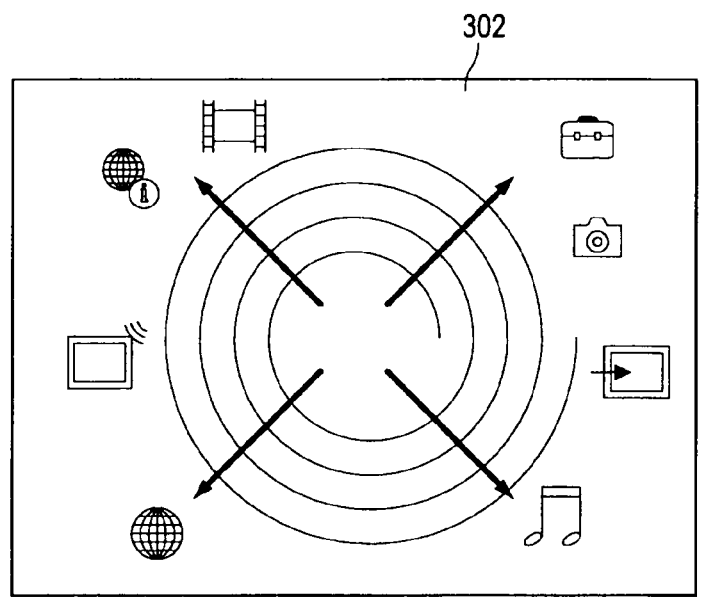
FIG. 20 is a schematic view showing a state where a UI in a spiral shape is displayed depending on a position of the mobile device.
Figure 21:
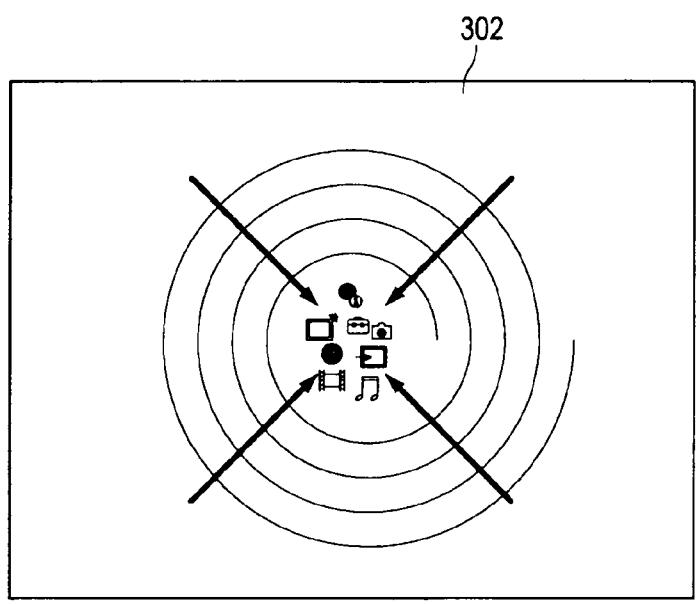
FIG. 21 is a schematic view showing a state where a UI in a spiral shape is displayed depending on a position of the mobile device.

Next, a description will be given of a case where the mobile device 200 is brought closer to the back side surface of the information processing apparatus 300. In the case of the configuration shown in FIG. 2, since the electrode plates 304 are arranged on the whole region of the back side surface of the information processing apparatus 300, the connection can be established also in the case where the mobile device 200 is brought closer to the back side surface of the information processing apparatus 300. In this case, as shown in FIGS. 20 and 21, a UI in a spiral shape is displayed on the display section 302 depending on a position of the mobile device 200. On this occasion, by changing the direction of the proceeding wave along the moving direction of data, the user can visually and intuitively recognize the moving direction of the data. The display on the display section 302 can be performed in the same manner as in the example shown in FIG. 6, and since the mobile device 200 is not present on the display section 302, the UI in a spiral shape or the like with the position of the mobile device 200 as the center point can be displayed without taking into consideration the size of the mobile device 200.

Figure 22:
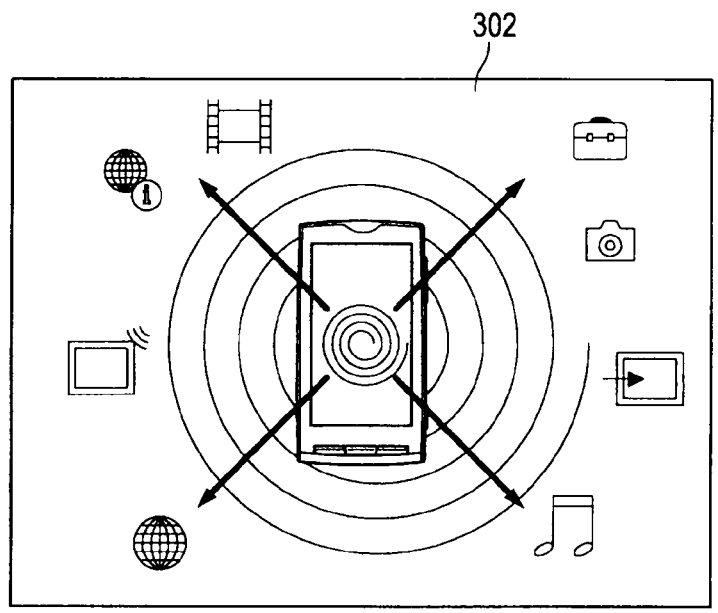
FIG. 22 is a schematic view showing a state where a display on a display section of the mobile device works in conjunction with a display on a display section of the information processing apparatus.
Figure 23:
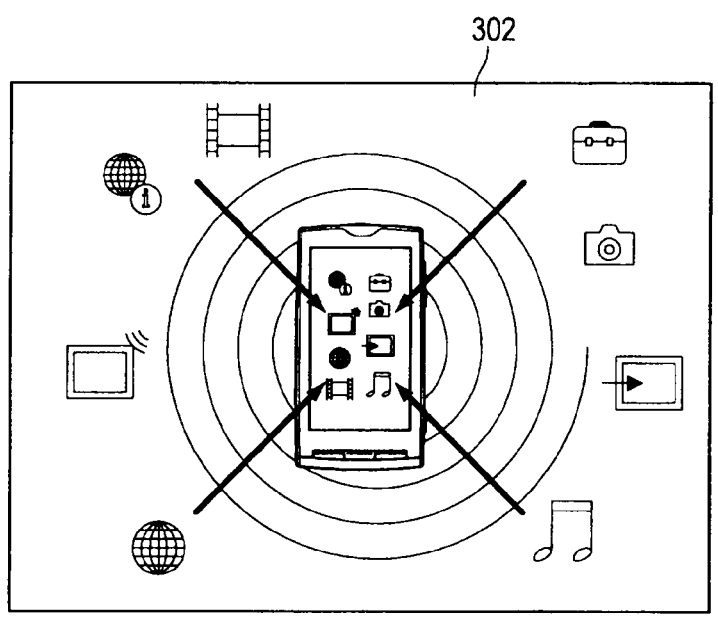
FIG. 23 is a schematic view showing a state where the display on a display section of the mobile device works in conjunction with the display on a display section of the information processing apparatus.

In FIGS. 22 and 23, there is provided a UI which notifies the user of a direction of data movement by performing, in the case where the mobile device 200 is placed on the display section 302, a display in a manner that the display section 202 of the mobile device 200 works in conjunction with the display section 302 of the information processing apparatus 300. Specifically, as shown in FIG. 22, in the case where the mobile device 200 transfers data to the information processing apparatus 300, when the mobile device 200 is held over the information processing apparatus 300, the display section 202 displays a motion in a manner that content is sucked into the spiral, for example. Then, the display section 302 of the information processing apparatus 300 displays the UI in which the content sucked into the spiral in the mobile device 200 is overflowed. In this case, when the transmission data processing section 112 of the mobile device 200 transmits data, the display processing section 118 of the mobile device 200 performs display processing in a manner that content is sucked into the spiral on the display section 202. The reverse display processing is performed in the case where the information processing apparatus 300 transmits data to mobile device 200, the state where the content is sucked into the spiral is displayed on the display section 302 of the information processing apparatus 300, and the state where the content is overflowed is displayed on the display section 202. The transfer of the content is expressed on two displays of the information processing apparatus 300 and the mobile device 200, respectively, and hence, the user can be notified of the status of the content transfer in a more easy-to-understand way.

Here, although it is also possible to display menu content on a display of a mobile device of the past, it is sometimes difficult to grasp a list of many pieces of menu content in the mobile device with an increased capacity and to operate the menu content, because the mobile device which is reduced in size has a small display section. As shown in the embodiment, the menu content of the mobile device 200 is temporarily displayed on the display section 302, which is larger than the display section of the mobile device, and the menu content is caused to be operated by a user, and hence, convenience of a user can be enhanced to a large degree. Further, the contents of the mobile device 200 held by an individual person may be shown to another person through a large-sized display, and hence, the communication related to the contents of the mobile device 200 can be facilitated. In addition, when using the mobile device 200 whose display section is not sufficiently large (or which does not have a display section), it becomes possible to perform operation and content management.

An advantage of placing the mobile device 200 on the display section 302 (on the display) is that the convenience of the user in the device operation can be enhanced owing to the display of the menu and the like on the basis of the extremely intuitive operation of "putting down (or moving) the mobile device 200". Further, an advantage of placing the mobile device 200 on the side part of the display section 302 (display side) is that a menu and the like can be displayed without hiding the large-sized display with the mobile device 200 itself. Still further, an advantage of handling content of two mobile devices 200 via the information processing apparatus 300 is that a status of content movement/sharing can be visually shown to the user in an easy-to-understand way by displaying, on the information processing apparatus 300 having the large-sized display, synchronization between the two mobile devices 200 and progress, degree, current status, and the like of the content movement.

2. Second Embodiment

Next, a second embodiment of the present invention will be described. The second embodiment relates to content movement between the mobile device 200 and the information processing apparatus 300. As the content movement, there are a case of moving content from the mobile device 200 to the information processing apparatus 300, and a case of moving content from the information processing apparatus 300 to the mobile device 200.

In the case of moving content from the mobile device 200 to the information processing apparatus 300, when the mobile device 200 is placed on the display section 302 of the information processing apparatus 300, content of the mobile device 200 moves to the information processing apparatus 300. In this case, when the content is a moving image and is being reproduced on the display section 202 of the mobile device 200, the content of the moving image which has been moved to the information processing apparatus 300 is reproduced continuously from the timing at which the content is moved onto the display section 302.

Further, on the display section 302, there can be provided multiple places for placing the mobile device 200, and different types of operation/data transfer can be performed depending on the place. In this case, based on a detection result of a position of the mobile device 200 performed by the position detection section 120 of the information processing apparatus 300, different types of operation/data transfer are performed. In the case where multiple pieces of content move to the information processing apparatus 300 and it is difficult to display the multiple pieces of content on the whole region of the display section 302, the pieces of contents are displayed in a manner that they are piled up.

Further, in the case of moving content from the information processing apparatus 300 to the mobile device 200, the mobile device 200 is held over the information processing apparatus 300, thereby copying the content of the information processing apparatus 300 into the mobile device 200. In this case, the information processing apparatus 300 displays content to be transmitted on the display section 302, and when the mobile device 200 is held thereover, the content is set to be transmitted to the mobile device 200. Further, there may be provided one or multiple places for accumulating pieces of content to be transmitted within the display section 302, and the pieces of content may be sucked together by holding the mobile device 200 over the place. The processing can be realized by: detecting the position of the mobile device 200 by the position detection section 120 of the information processing apparatus 300; and, in the case where it is recognized that the position of the content displayed on the display section 302 by the display processing section 118 corresponds to the position of the mobile device 200, sucking the content by the mobile device 200.

Further, multiple mobile devices 200 are connected to the information processing apparatus 300, and content is visually moved via the information processing apparatus 300. Each mobile device 200 is placed on the display section 302 or placed on a side surface of the information processing apparatus 300. For example, multiple mobile devices 200 are placed on the right side surface and the left side surface of the information processing apparatus 300, and the content is moved from one mobile device 200 to another mobile device 200 via the information processing apparatus 300. In this way, content viewing/movement by multiple users via the information processing apparatus 300 can be performed.

Next, there will be described data transfer with a flick operation of the mobile device 200. In the example described above, although the data transfer is automatically performed in the state of holding the mobile device 200 over the information processing apparatus 300 (after the establishment of connection), in this example, as shown in FIG. 24, when flicking the content being displayed in the mobile device 200 in the state where the mobile device 200 is held over the information processing apparatus 300, the data is transferred to the information processing apparatus 300. The flick operation may be performed by flicking the mobile device 200 itself, or by performing flick operation to the touch panel 170 on the display section 202 of the mobile device 200. In the same manner, when the content being displayed on the display section 302 of the information processing apparatus 300 is flicked toward the mobile device 200 by operation of the touch panel 170 on the display section 302, the data is transferred to the mobile device 200. The flick operation on the touch panel 170 can be detected at the operation detection section 124 based on the output of the touch panel 170. Further, in the case of performing flick operation of the mobile device 200 itself, the operation can be detected based on the output of the acceleration sensor 150 included in the mobile device 200. In the case where the flick operation is detected, the transmission data processing section transmits data such as content to a communication partner device.

Further, in FIG. 24, in addition to the case of flicking the mobile device 200 itself on the display section 302, when content on the display section 202 of the mobile device 200 is touched by a user and moved to a predetermined direction (for example, data transfer direction shown in FIG. 24), the content may be displayed in a manner that the content is moved on the display section 302 in that direction in the same manner as in the case of flicking the mobile device 200 itself In this case, selection of content on the mobile device 200 by user's finger and information of flicking direction are detected by the touch panel of the mobile device 200, and by notifying the information processing apparatus 300 of the selection and the information, the content movement can be performed in the same manner as in FIG. 24. Accordingly, the content can be moved in any direction on a large-sized display section 302 and can be displayed on the desktop while confirming the substance of the content to be transferred on the display section 202 of the mobile device 200, and hence, it becomes possible to intuitively move the content with a sense that the content is "scattered" by the finger.

Further, when content being reproduced on the display section 202 of the mobile device 200, which is being held over the information processing apparatus 300, is flicked on the display of the information processing apparatus 300, content can be transferred such that the reproduction display is switched to the reproduction display of the display section 302 of the information processing apparatus 300. In the same manner, when content being reproduced on the display section 302 of the information processing apparatus 300 is flicked toward the mobile device 200 by operation of the touch panel 170 on the display section 302, the content being reproduced is transferred to the mobile device 200, and the reproduction display can be switched to the reproduction display on the display section 202 of the mobile device 200.

Figure 25:
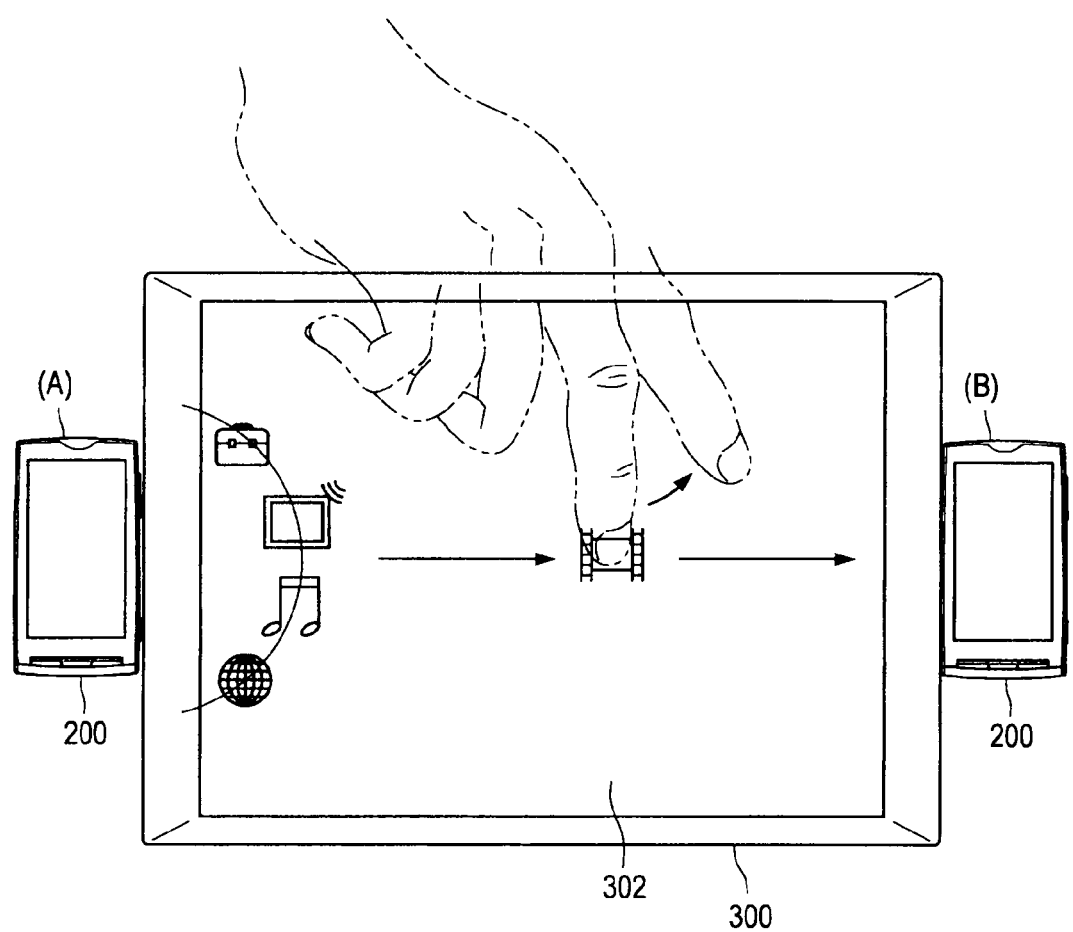
FIG. 25 is a schematic view showing an example of moving content by interposing the information processing apparatus between mobile devices.

FIG. 25 is a schematic view showing an example of moving content with between-devices-flicking by interposing the information processing apparatus 300 between two mobile devices 200. As shown in FIG. 25, a mobile device (A) 200 and a mobile device (B) 200 are placed on the left and right sides of the information processing apparatus 300, respectively, and the mobile device (A) 200 and the mobile device (B) 200 are each connected to the information processing apparatus 300. In this case, pieces of content of the mobile device (A) 200 at the left side are displayed in a semicircular shape on the display section 302. By operating the touch panel 170 of the display section 302, the user can move the content to the mobile device (B) 200. In this case, when a distance between the content and the mobile device (B) 200 comes close to a predetermined value or less by the operation of the touch panel 170, for example, data is transmitted to the mobile device (B) 200 by the transmission data processing section 112. In this case, content is transferred from the mobile device (A) 200 to the information processing apparatus 300, and the content is temporarily stored in the data accumulation section 130 of the information processing apparatus 300. After that, under a predetermined condition, the content is transferred by the transmission data processing section 112 of the information processing apparatus 300 to the mobile device (B) 200. In this way, in the present embodiment, the content is not directly moved from the mobile device (A) 200 to the mobile device (B) 200, and the content is temporarily stored in the information processing apparatus 300.

Further, in the state shown in FIG. 25, content of the two mobile devices 200 can be synchronized. In this case, the pieces of content of each of the two mobile devices 200 are displayed in a semicircular shape as those of the mobile device (A) 200 shown in FIG. 25, and synchronization operation may be performed by flicking content into both directions with the operation of the touch panel 170. Further, the progress of the synchronization processing may be displayed by the number of remaining pieces of data. Also, the UI may be displayed in a manner that content whose synchronization has been finished is hidden. By performing such synchronization processing, information held by one mobile device 200 may be conformed to the other mobile device 200.

Figure 26:
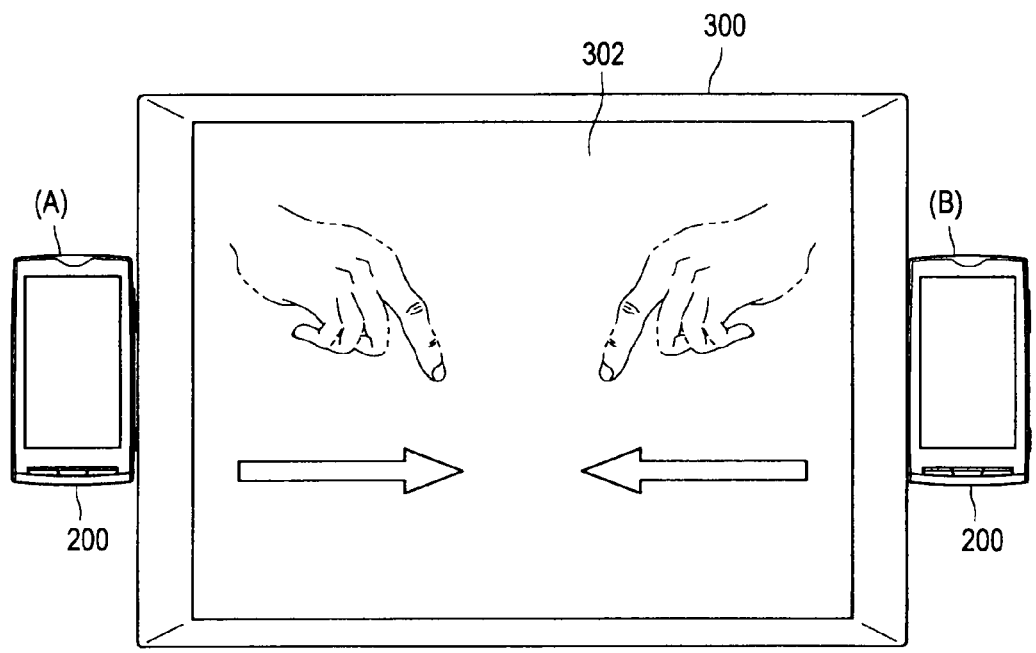
FIG. 26 is a schematic view showing a state of performing synchronization triggered by a gesture.

FIG. 26 is a schematic view showing a state of performing synchronization triggered by a gesture. As shown in FIG. 26, in the case where, by the touch panel operation on the display section 302, the touch panel is operated in the right direction from the mobile device (A) 200 at the left side, information of the mobile device (A) 200 at the left side is synchronized with the mobile device (B) 200 at the right side. Further, in the case where the touch panel is operated in the left direction from the mobile device (B) 200 at the right side, information of the mobile device (B) 200 at the right side is synchronized with the mobile device (A) 200 at the left side.

Figure 27:
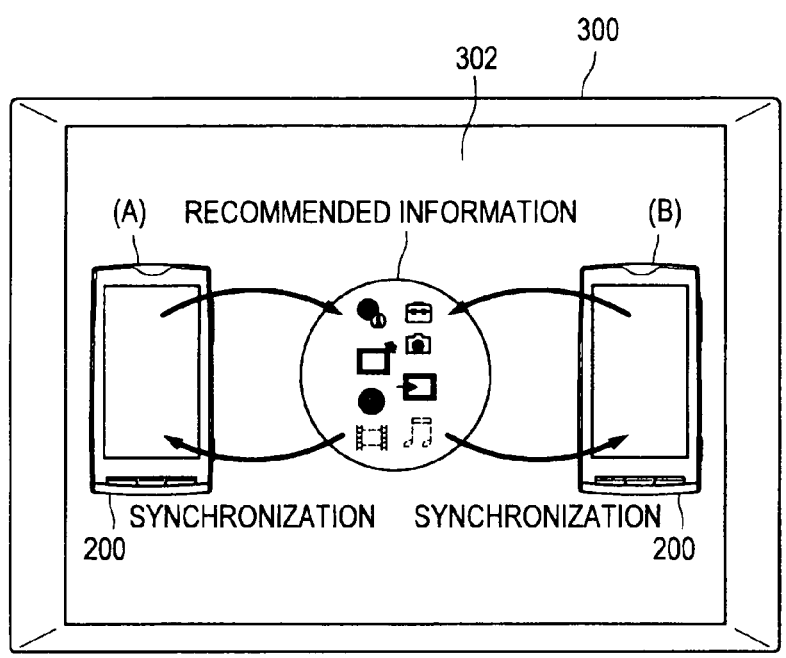
FIG. 27 is a schematic view showing a state of performing synchronization of information of a database of the information processing apparatus with a mobile device (A) and a mobile device (B)

FIG. 27 is a schematic view showing a state of performing synchronization of information of a database of the information processing apparatus 300 with the mobile device (A) 200 and the mobile device (B) 200. In the example shown in FIG. 27, there is shown a state where recommended information is shown on the display section 302 of the information processing apparatus 300, and the information is synchronized with the mobile device (A) 200 and the mobile device (B) 200. In this way, both the mobile device (A) 200 and the mobile device (B) 200 can acquire information of the recommended database. In this case, when the connection with the mobile device 200 is established in the state where the recommended information of the database is displayed on the display section 302 by the display processing section 118, the displayed information of the database is transmitted to the mobile device 200. Note that the recommended information can be stored in the data accumulation section 130.

Figure 28:
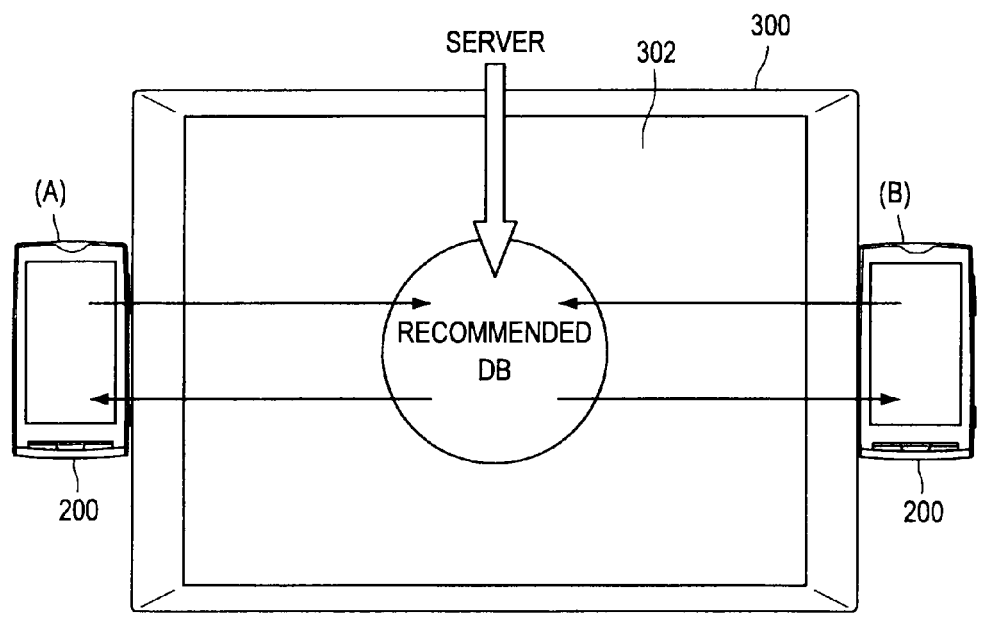
FIG. 28 is a schematic view showing a state where information of a recommended database is duplicated into latest information using information of a server.

FIG. 28 shows a state where the information processing apparatus 300 and an external server are connected to each other via a communication line such as the Internet, and information of a recommended database is duplicated into latest information using information of the server. By updating the information of the recommended database to the latest information all of the time, the convenience at the time of backup, moving house, or the like can be enhanced.

Figure 29:
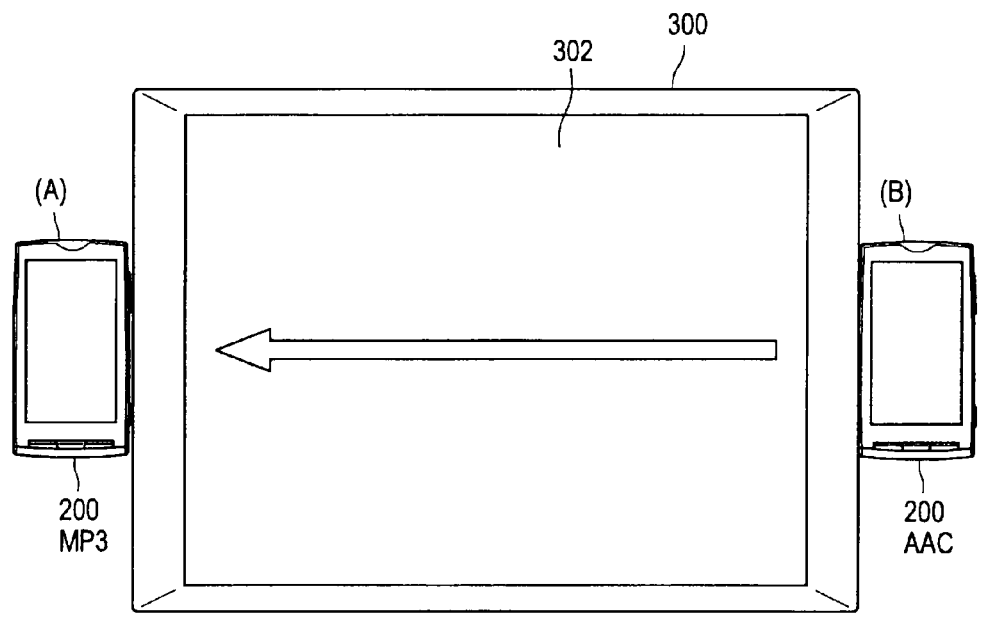
FIG. 29 is a schematic view showing a state of performing copying while performing transcoding.

FIG. 29 is a schematic view showing a state of performing copying while performing transcoding. For example, when mutually moving data among portable music players, mobile phones, and the like, for example, the information processing apparatus 300 converts (transcodes) a format and performs copying. In the example shown in FIG. 24, the information processing apparatus 300 transcodes from AAC (Advanced Audio Coding) format to MP3 format. Accordingly, the processing with a large load that is difficult to be handled by the mobile device 200 can be executed by the information processing apparatus 300 instead. The format that each mobile device 200 is compatible with is acquired from information that specifies the mobile device 200.

Figure 30:
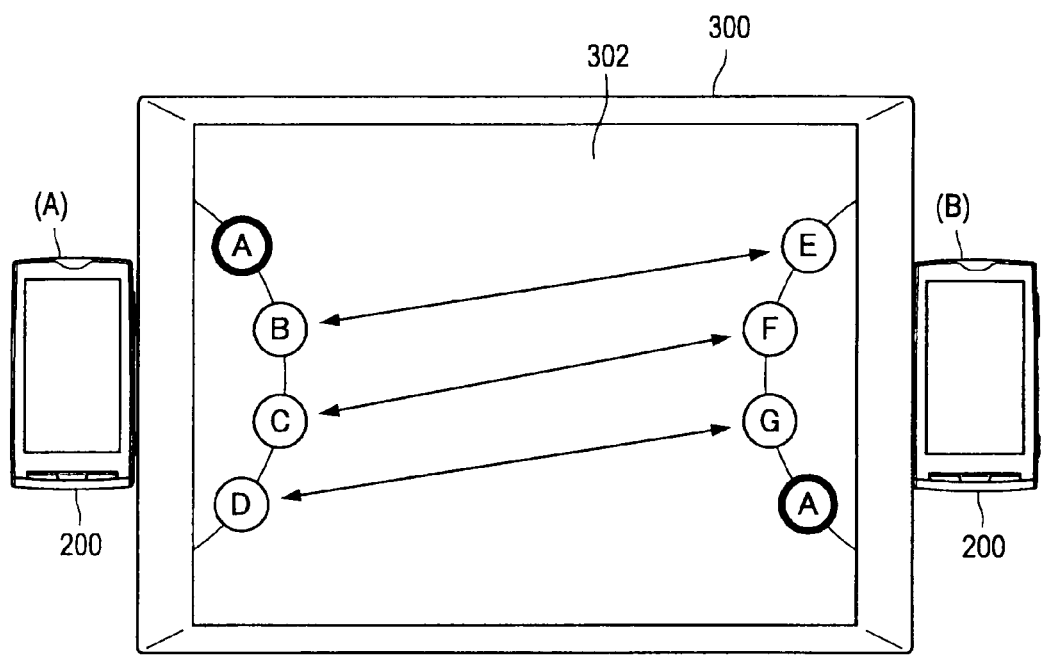
FIG. 30 is a schematic view showing a state of exchanging addresses between two mobile devices (A) and (B)

FIG. 30 is a schematic view showing a state of exchanging addresses between two mobile devices, the mobile device (A) 200 and the mobile device (B) 200, in the case where the mobile device 200 holds an e-mail address or the like. In this case, the mobile device (A) 200 and the mobile device (B) 200 are connected to each other via the information processing apparatus 300, and when there is information that is registered in the address book of one of the two mobile devices 200 but is not registered in the address book of the other mobile device 200, the mobile device 200 holding the information transmits the address to the mobile device 200 that is not holding the information and thus performing address exchange. In the example shown in FIG. 30, addresses held by the two mobile devices 200 are displayed on the display section 302, and the address held by both mobile devices 200 is only an address A. Accordingly, the addresses that are not common between the mobile devices 200 are transferred to the other mobile device 200, and are copied in the other mobile device 200. In this way, the address information between the two mobile devices 200 can be made common. In this case, the two mobile devices 200 each compare the address information received by the received data processing section 116 with its own address information, and transmit an address that is not held by the communication partner device from the transmission data processing section 112. Note that the address information can be stored in the data accumulation section 130.

Figure 31:
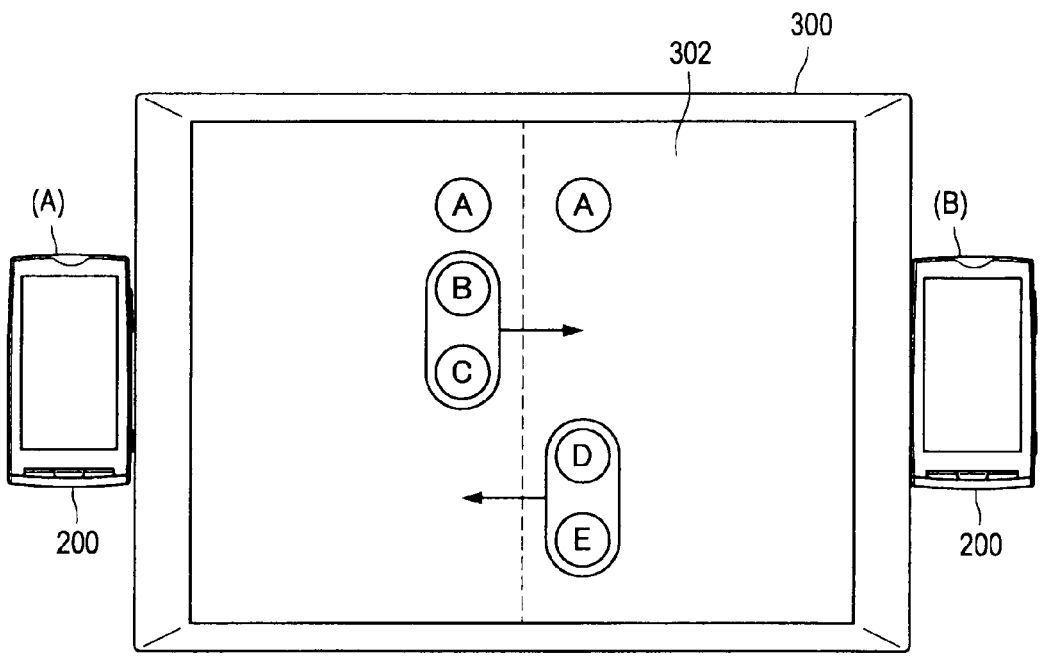
FIG. 31 is a schematic view showing a state of selecting multiple addresses by enclosing the addresses using a touch panel and exchanging the enclosed addresses.

Further, at the time of the address exchange, there can be displayed a UI for selecting an address. For example, as shown in FIG. 31, multiple addresses may be enclosed and selected by the operation of the touch panel 170, and the enclosed addresses may be exchanged with each other. In the example shown in FIG. 31, addresses B and C held by the mobile device (A) 200 are enclosed by the operation of the touch panel 170 and transmitted to the mobile device (B) 200. Further, addresses D and E held by the mobile device (B) 200 are enclosed by the operation of the touch panel 170 and transmitted to the mobile device (A) 200.

Further, there may be considered a technique of introducing a social networking service to each other, for example, based on the address information that is held by both the mobile devices 200. In this case, address information may be exchanged between the mobile devices 200, and a correlation diagram between the mobile devices 200 may be output. Those events may be caused to occur in the case where the mobile device (A) 200 and the mobile device (B) 200 hold the same information (address A in the example shown in FIG. 30).

Although the examples shown above mainly represent the cases of placing the mobile device 200 on the side surface of the information processing apparatus 300, the same processing can be performed also in the case of placing the mobile device 200 on the display section 302. In the case where the mobile device 200 is placed on the display section 302, depending on a distance between the two mobile devices 200 and when the distance between the mobile devices 200 is shorter than a predetermined value, the data exchange is performed in the state nearer to synchronization. Further, when the two mobile devices 200 are moved away from each other, there can be performed processing of exchanging only data with high correlation with each other, for example.

In this case, after placing the mobile devices 200 on the display section 302, synchronization of data starts when the two mobile devices 200 are brought closer to each other. The fact that the synchronization of data has started is displayed with a UI (for example, a ripple UI). The mobile devices 200 may each have a territory in the surrounding thereof, and when the territories overlap with each other, an action corresponding thereto (synchronization) may begin.

Figure 32:
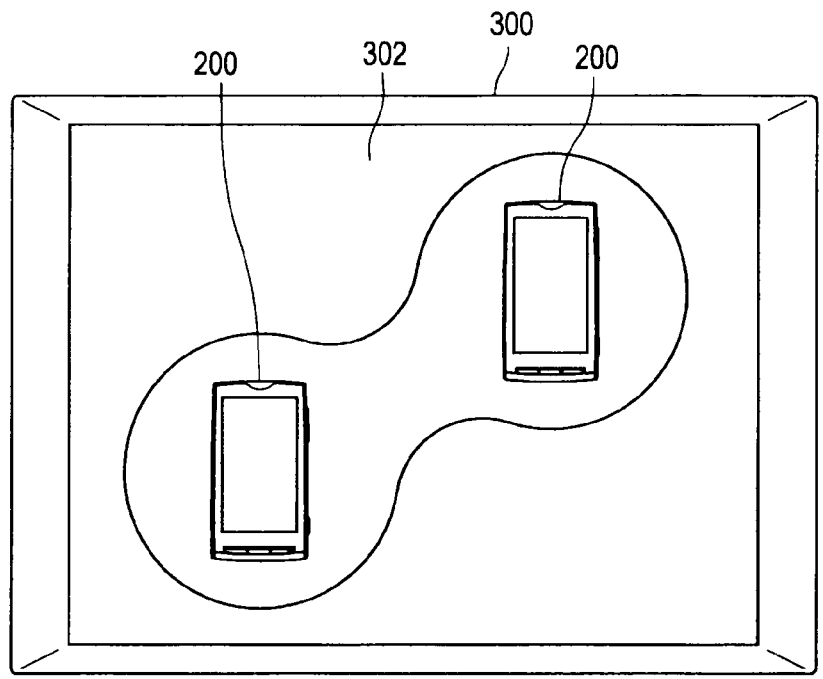
FIG. 32 is a schematic view showing a state of performing synchronization depending on a distance when the mobile devices are placed on the display section.
Figure 33:
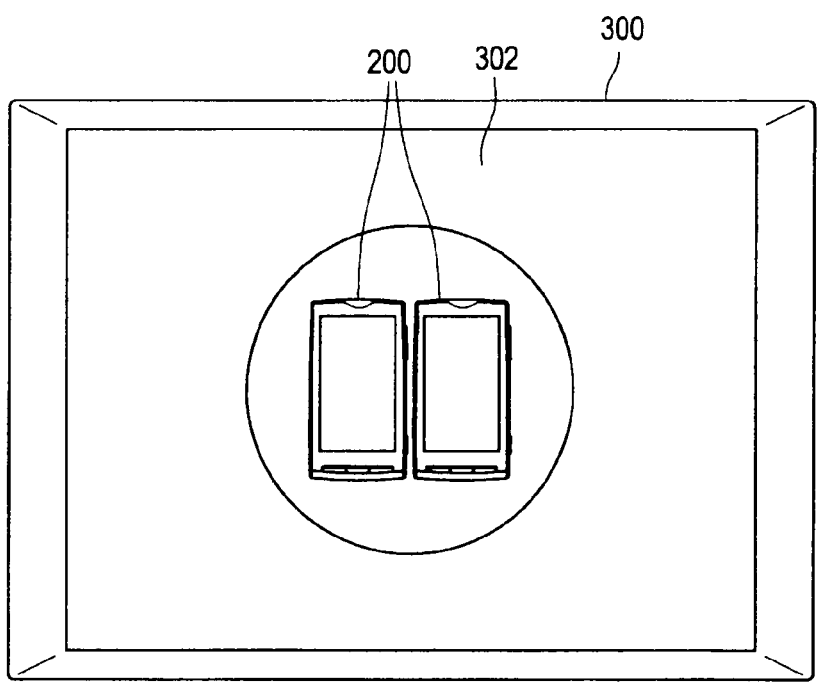
FIG. 33 is a schematic view showing a state of performing synchronization depending on a distance when the mobile devices are placed on the display section.
Figure 34:
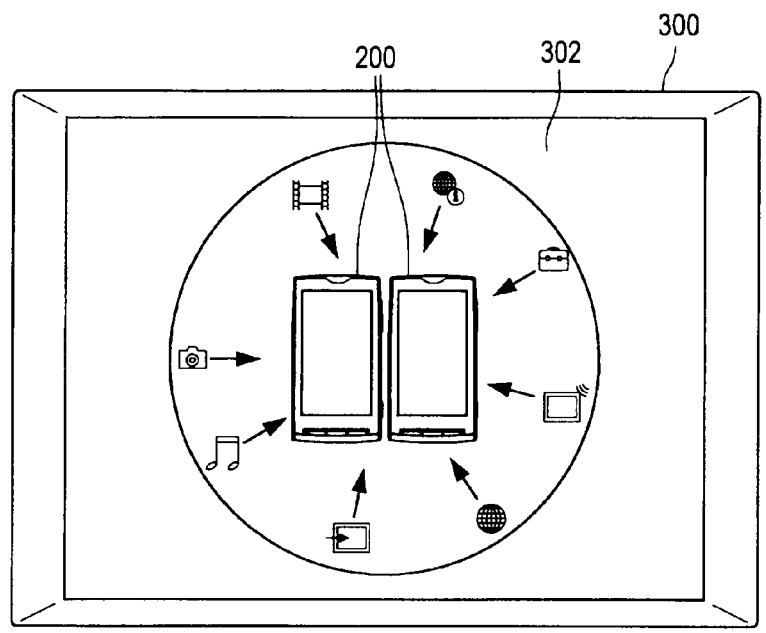
FIG. 34 is a schematic view showing a state of performing synchronization depending on a distance when the mobile devices are placed on the display section.

FIGS. 32 to 34 are each a schematic view showing a state of performing synchronization depending on a distance when the mobile devices 200 are placed on the display section 302. As shown in FIG. 32, in the case where the distance between the two mobile devices 200 is more than a predetermined value, only data with high degree of correlation is transferred to each other, and partial synchronization is performed. Further, as shown in FIG. 33, in the case where the distance between the two mobile devices 200 is equal to or less than the predetermined value, all the pieces of information of the both mobile devices 200 are copied and the synchronization is performed completely. In this case, as shown in FIG. 34, all pieces of data are displayed around the two mobile devices 200, and the display of data whose synchronization has been completed is sequentially hidden. Accordingly, the user can determine the progress of data copying from the display state.

Figure 35:
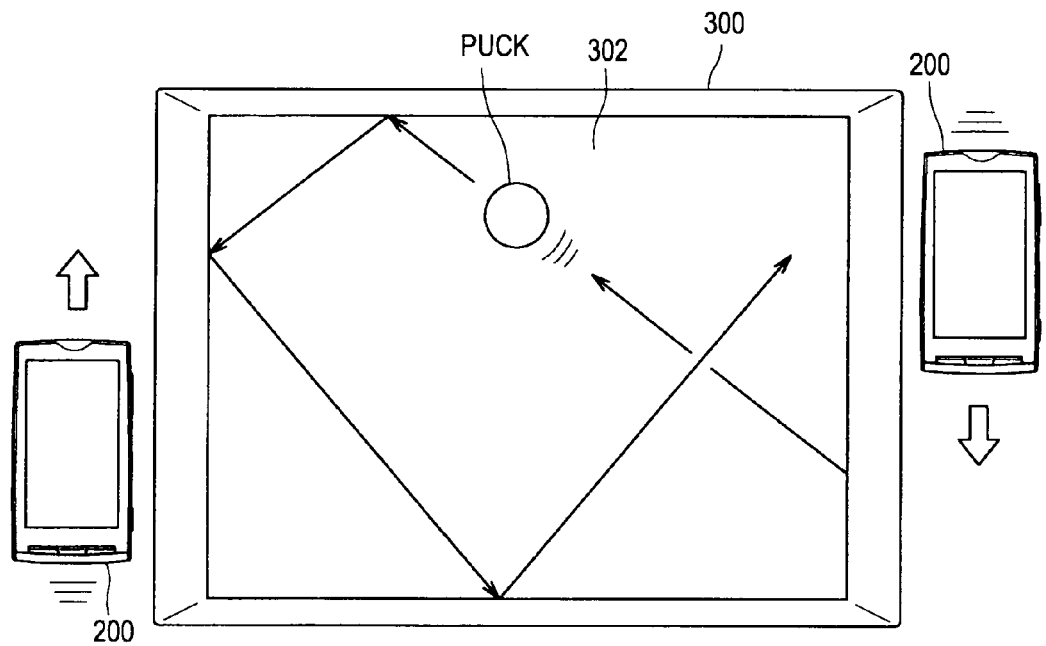
FIG. 35 is a schematic view showing a state of playing hockey with a display section being interposed, as application synchronization.

FIG. 35 is a schematic view showing a state of playing hockey with a display section 302 being interposed therebetween, as application synchronization. Here, information held by one mobile device 200 is likened to a hockey puck and the hockey puck is displayed on the display section 302. When the puck sent from one mobile device 200 is caught by the other mobile device 200, the synchronization of the information is performed. Here, in the case where the position on the left and right edges of the display section 302 at which the puck hits and the position of the mobile device 200 correspond to each other, the puck is caught by the mobile device 200. Alternatively, in the case where the puck sent from one mobile device 200 is not caught by the other mobile device 200, the synchronization of the information may be performed.

3. Third Embodiment

Next, a third embodiment of the present invention will be described. The third embodiment relates to processing of synchronizing video between the mobile device 200 and the information processing apparatus 300, and performing penetration, enlargement, complement, and the like. In the case of placing the mobile device 200 on the display section 302, by causing a display on the display section 302 to be penetrated on the display section 202 of the mobile device 200, video on the display section 302, which is hidden under the mobile device 200, can be confirmed, and operation via the mobile device 200 becomes possible. Further, by enlarging a display on the display section 302 and displaying the enlarged display on the display section 204, desired content can be enlarged and viewed.

Figure 36:
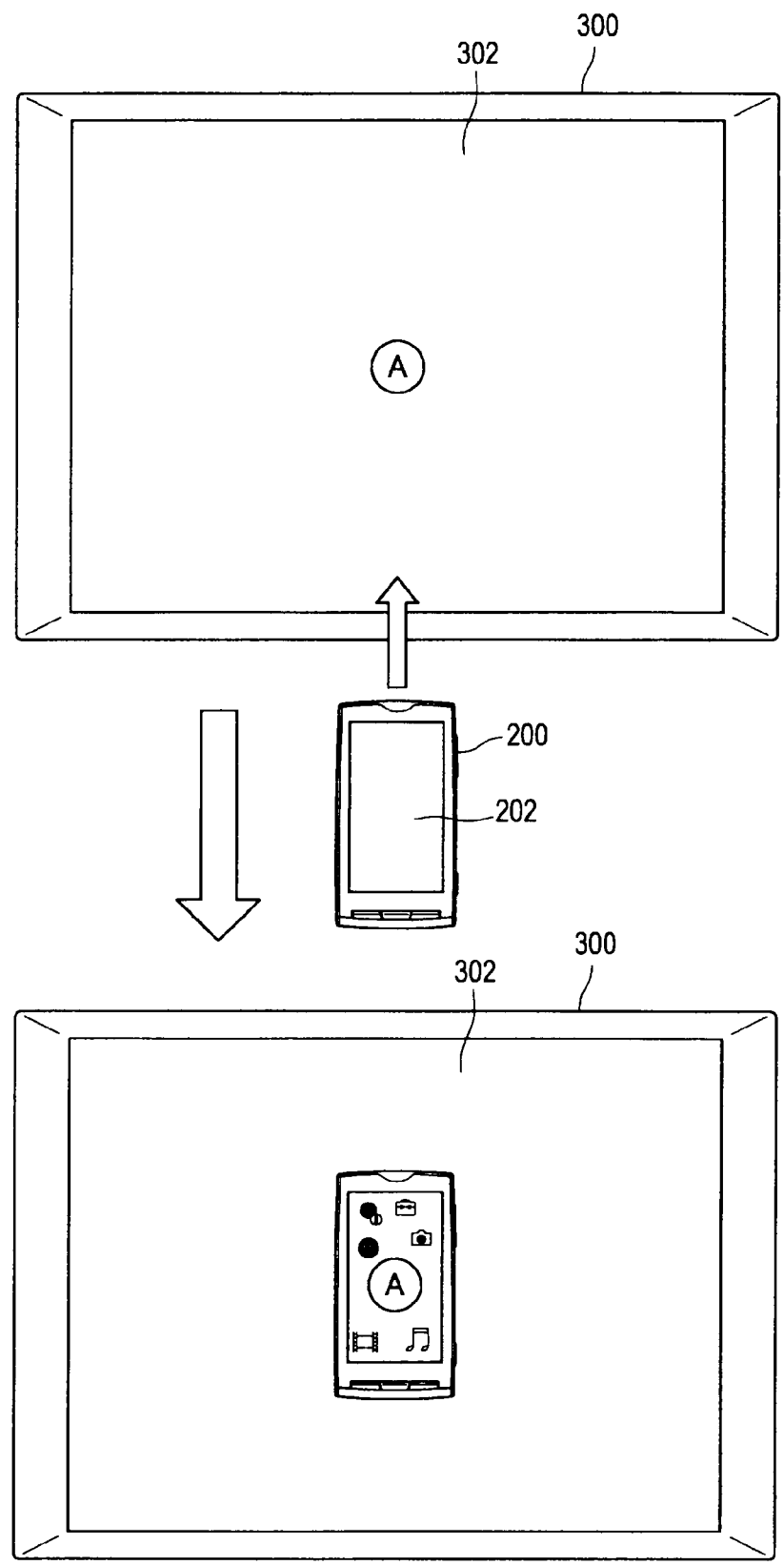
FIG. 36 is a schematic view showing a state where content "A" is displayed in a manner as if the content "A" penetrates the mobile device.

FIG. 36 shows a state where, when content "A" is displayed on the display section 302 and the mobile device 200 is placed such that the mobile device 200 covers the content "A", the content "A" is displayed on the display section 202 of the mobile device 200 as if the content "A" penetrates the mobile device 200.

In this way, in the example of penetration, when the mobile device 200 is placed on the display section 302 (large-sized display), the display on the display section 302 is penetrated and displayed on the display section 202. In this case, a UI may be changed depending on whether content can be transferred from the information processing apparatus 300 to the mobile device 200. Further, as a function realized in combination with the penetration, there may be displayed functions (icon and menu) that is compatible with a combination with the mobile device 200 on the display section 202 of the mobile device 200 when the mobile device 200 is held over the display section 202. In the processing of the third embodiment, the position detection section 120 detects a position of the mobile device 200 on the display section 302 based on a received signal strength detected by the received signal strength (electric field intensity) detection section 114. The position of the mobile device 200 is compared with a position of the content, the icon, or the like on the display section 302, which is displayed by the display processing section 118, and in the case where the position of the mobile device 200 and the position of the icon or the like on the display section 302 correspond to each other, information of the icon or the like is sent to the mobile device 200 from the transmission data processing section 112. Thus, the mobile device 200 can display the information of the icon or the like on the display section 202.

Further, as shown in FIG. 36, on the display section 202 of the mobile device 200 which is held over the display section 302, there are displayed information of the display section 302 at the position just under the mobile device 200 and a function (menu) corresponding thereto. In this case, the transmission data processing section 112 of the information processing apparatus 300 transmits, to the mobile device 200, the information of the content, the icon, and the like whose display position on the display section 302 corresponds to the position of the mobile device 200, and also the information of the function (menu) related thereto. Accordingly, in the mobile device 200, there can be displayed on the display section 202, together with the information of the content, the icon, or the like which is hidden behind the mobile device 200, also the related information. In the case where the function of the mobile device 200 does not support the information, it is set such that a menu is not displayed when the mobile device 200 is held over the display section 302, or it may be set such that the menu is grayed out.

Further, when the mobile device 200 is held over an icon or the like on the display section 302, there may be displayed a function that can be used on the mobile device 200 (function that can be realized in combination of the mobile device 200 and the information processing apparatus 300).

Further, content may be displayed on the mobile device 200 in advance, and when the mobile device 200 is held over the information processing apparatus 300 and the content is caused to move to the information processing apparatus 300, there may be used a UI that exhibits the state in a way that the display section 202 of the mobile device 200 is copied to the display section 302 of the information processing apparatus 300. Accordingly, the user can visually recognize that the content has been copied (moved) from the mobile device 200 to the information processing apparatus 300.

Figure 37:
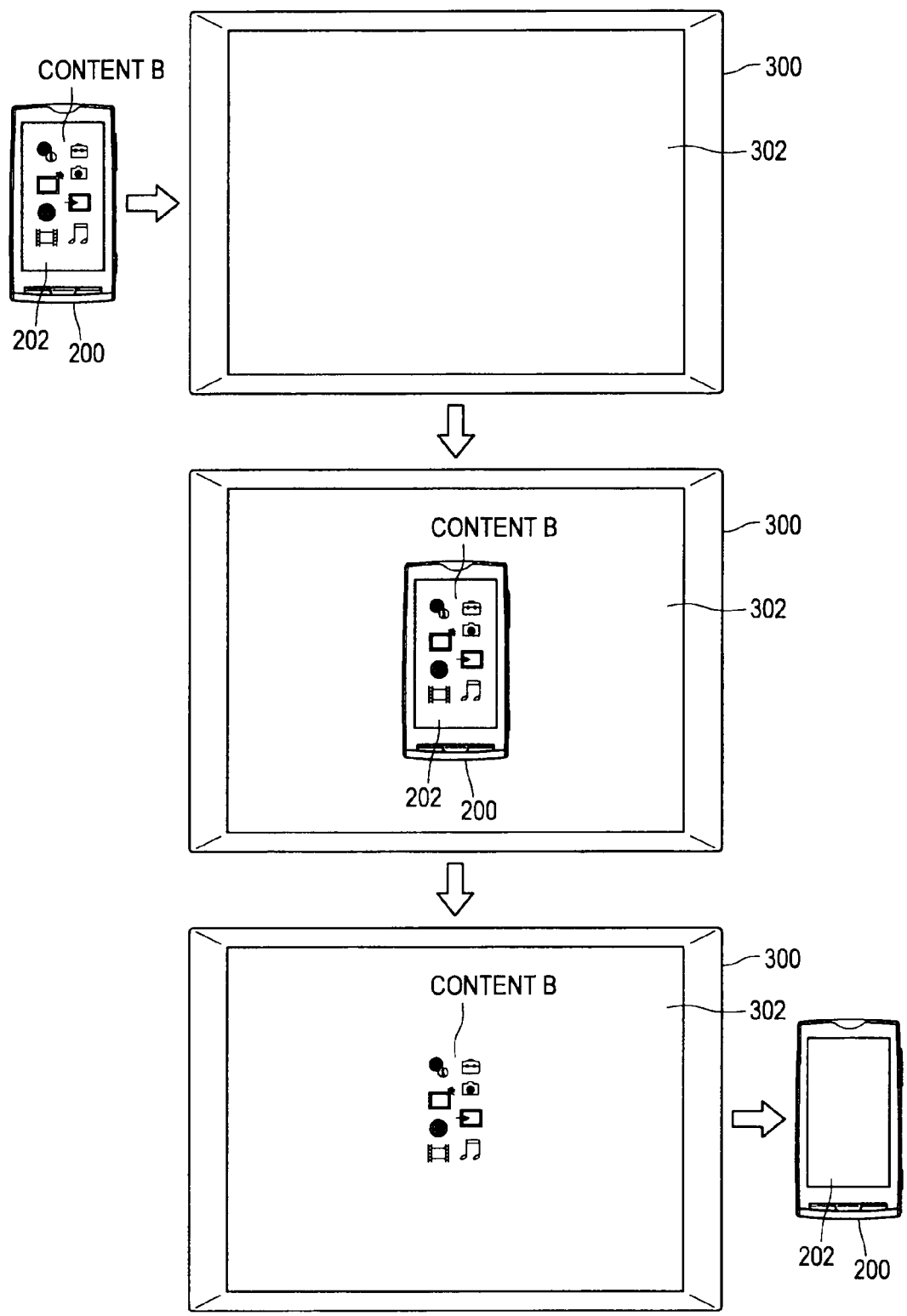
FIG. 37 is a schematic view showing a state where data is moved from the mobile device to the information processing apparatus.

FIG. 37 is a schematic view showing a state where data is moved from the mobile device 200 to the information processing apparatus 300. As shown in the top diagram of FIG. 37, content B is displayed on the display section 202 of the mobile device 200 before the mobile device 200 is held over the information processing apparatus 300. The middle diagram of FIG. 37 shows a state where the mobile device 200 on which the content B is displayed is held over the display section 302. When the mobile device 200 is held over the display section 302, information of the content B is transferred to the information processing apparatus 300. The bottom diagram of FIG. 37 shows a state where the mobile device 200 is moved away from the display section 302 starting from the state shown in the middle diagram of FIG. 37. When the mobile device 200 is moved away from the display section 302, the information of the content B which has been transferred is displayed on the display section 302. Accordingly, the user can visually recognize that the content B is transferred from the mobile device 200 to the information processing apparatus 300.

Figure 38:
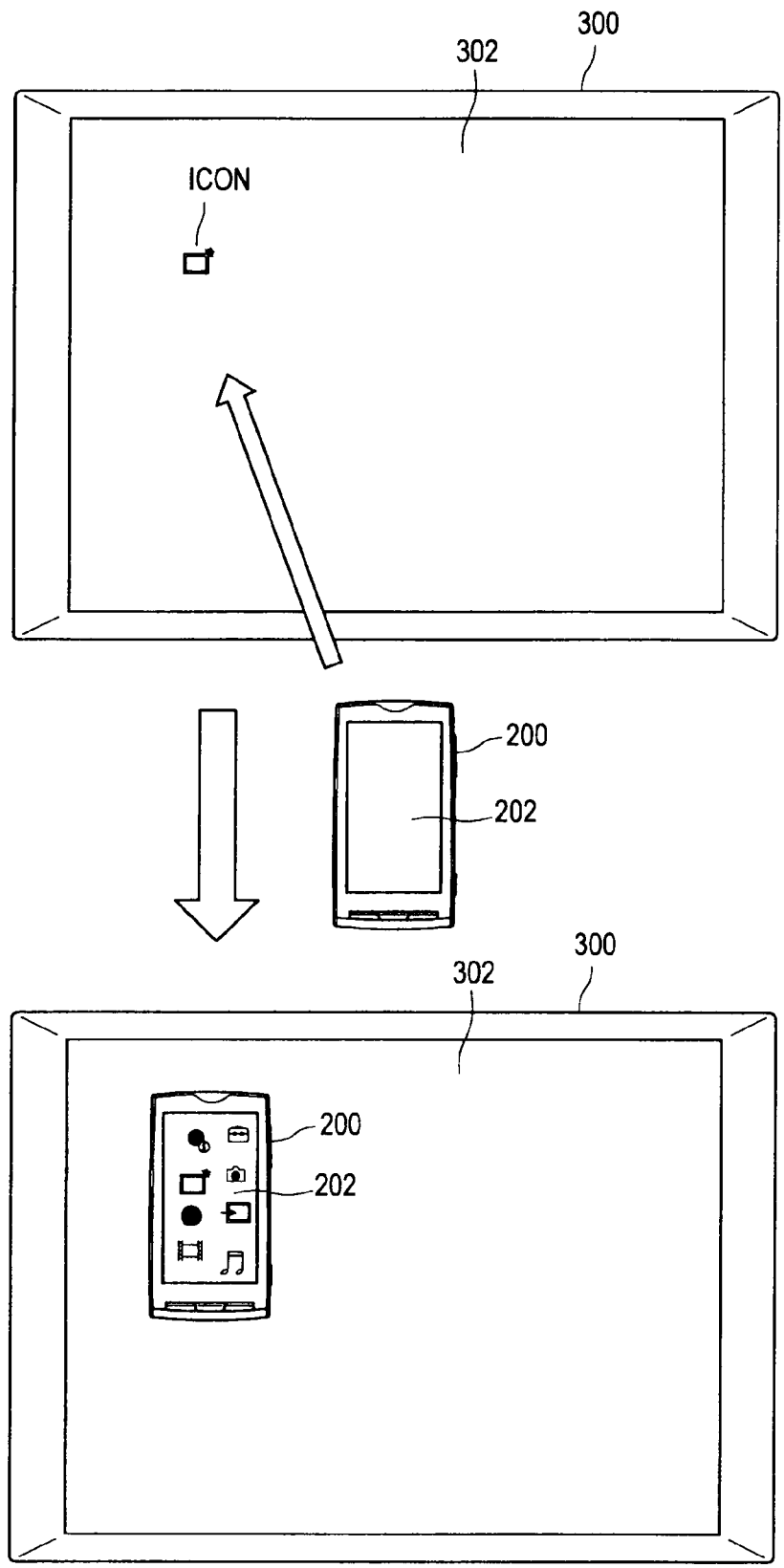
FIG. 38 is a schematic view showing an example of displaying, when the mobile device is held over a folder icon, a content of the folder on the display section of the mobile device.

Next, there will be described an example of enlarging and displaying an icon or the like, which is displayed on the display section 302, on the display section 202 of the mobile device 200. FIG. 38 shows an example of displaying, when the mobile device 200 is held over a folder icon displayed on the display section 302, a content of the folder on the display section 202 of the mobile device 200. In this case, it can be set in a manner that the content of the folder can be seen only by a specific device that is held over the folder icon, which can be used for security purposes.

Figure 39:
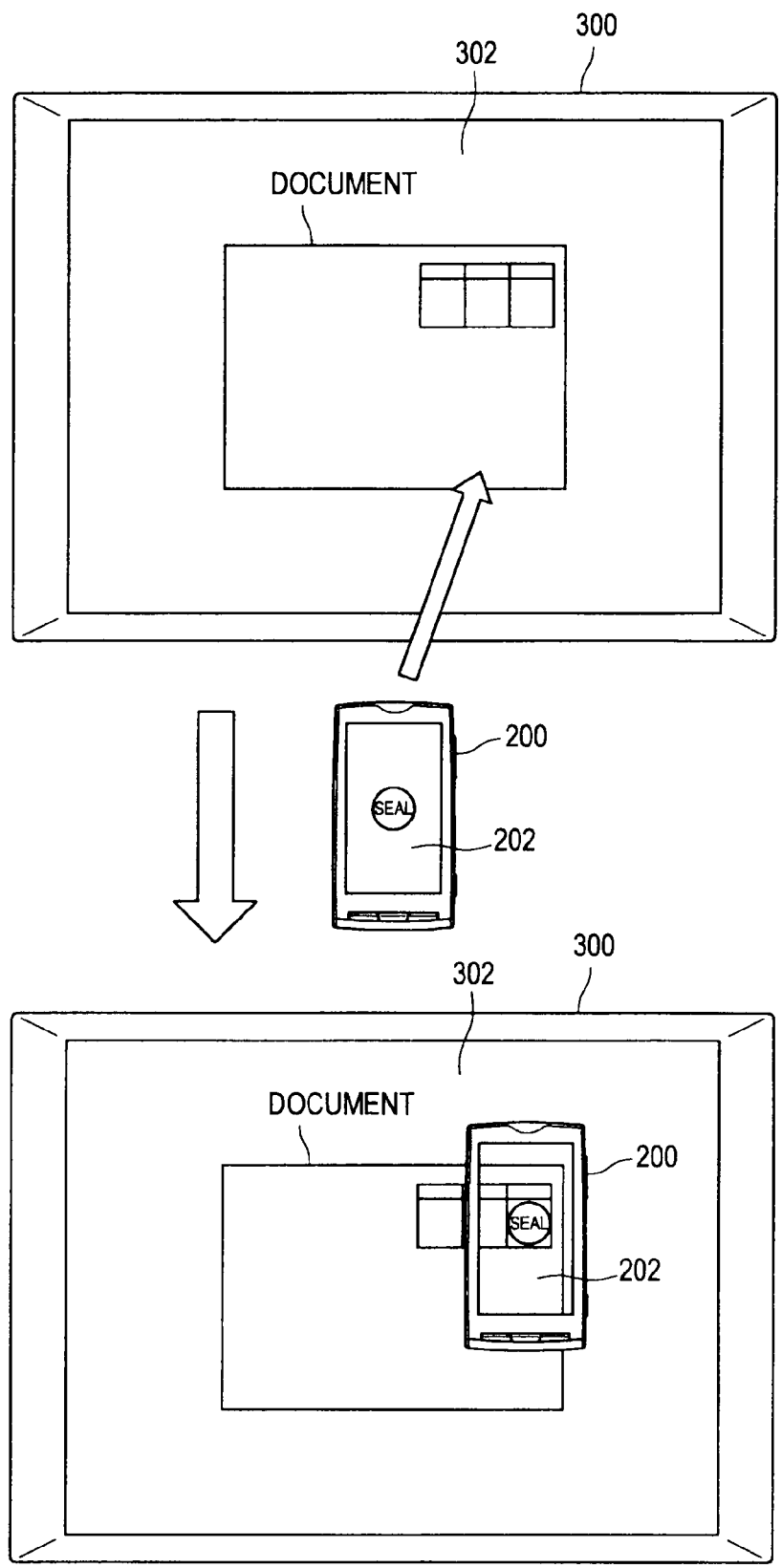
FIG. 39 is a schematic view showing a state of affixing an electronic seal using the mobile device to a document displayed on the display section.

Further, as a practical application of FIG. 38, the mobile device 200 can be used as an electronic seal (approval). FIG. 39 is a schematic view showing a state of affixing an electronic seal using the mobile device 200 to a document displayed on the display section 302. As shown in the top diagram of FIG. 39, a document is displayed on the display section 302 and an electronic seal is displayed on the display section 202 of the mobile device 200. The mobile device 200 is authorized to affix the electronic seal. Then, as shown in the bottom diagram of FIG. 39, when the mobile device 200 is held over the display section 302, there is displayed on the display section 202 an affixing position of the document, which is displayed on the display section 302, in a penetrating manner. When predetermined operation is performed in this state, the electronic seal of the mobile device 200 is affixed to the document of the display section 302, accordingly, the seal is affixed to the document on the display section 302. The seal can be more easily affixed to the document by enlarging the display of the document on the display section 202 of the mobile device 200 to the size larger than that on the display section 302.

Figure 40:
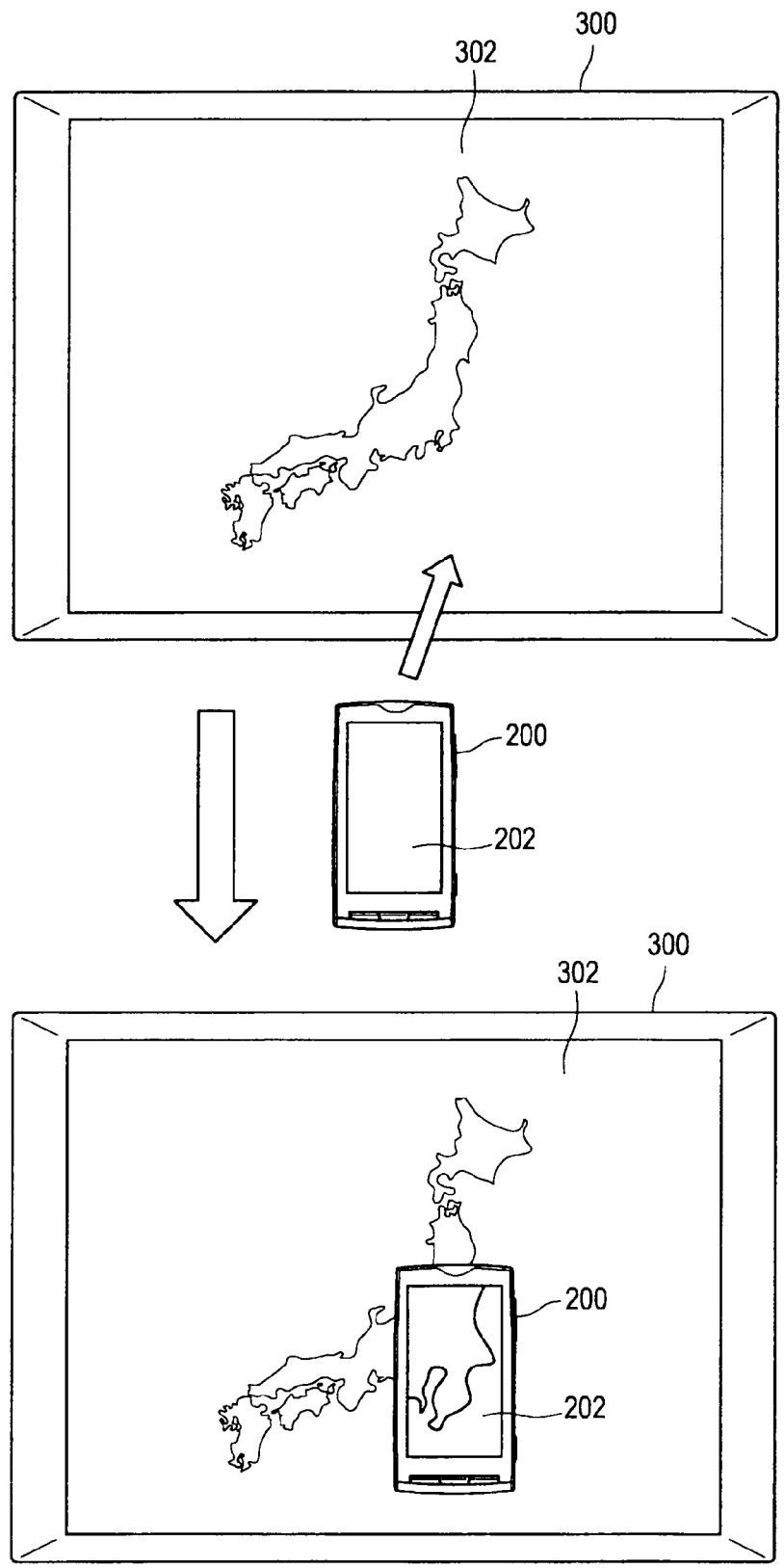
FIG. 40 is a schematic view showing an example in which a map of Japan is displayed on the display section of the information processing apparatus, and, by holding the mobile device over the display section of the information processing apparatus, an enlarged display of a map of the Kanto area is displayed on the display section of the mobile device.

Next, there will be described a case where a map displayed on the display section 302 is displayed in an enlarged manner on the display section 202 of the mobile device 200. In FIG. 40, there is displayed a map of Japan on the display section 302, and FIG. 40 shows an example of performing enlarged display of the Kanto area on the display section 202 by holding the mobile device 200 over the display section 302. With the area subjected to the enlarged display, there may also be displayed information of the area (restaurant information, transportation information such as railway and road, weather information of the area, and the like). In this case, information of the area is added beforehand to the map information displayed on the information processing apparatus 300, and by acquiring the information by the mobile device 200, the information is displayed on the display section 202.

Further, Sekai Camera-like information complement can be also performed by displaying, on the display section 202, the area other than the territory displayed on the display section 302. For example, the mobile device 200 is placed outside the display section 302, and a map of the area other than the display territory is set to be displayed on the display section 202 as an expanded screen.

Further, in addition to the map, there can be exemplified the following function: when the mobile device 200 is held over a photograph (group photograph or the like), a person in the photograph is enlarged and displayed on the display section 202; and persons registered in the address book or the like of the mobile device 200 held over the photograph are searched and a result thereof is displayed. In this case, personal information is added beforehand to the photograph displayed on the information processing apparatus 300, and the search is performed by comparing the information with information in the address book.

4. Fourth Embodiment

Next, a fourth embodiment of the present invention will be described. In the fourth embodiment, in the case where the mobile device 200 is held over the information processing apparatus 300, the mobile device 200 is guided to a position with good communication status. For example, a UI indicating the position at which the antenna 304 locates is displayed on the display section 302 only when using wireless communication. Further, in the case where the mobile device 200 is placed on the display section 302, and in the case where the position of the mobile device 200 is deviated from the position of the antenna 304, there is displayed a UI which guides the mobile device 200 to an appropriate antenna position. In addition, a UI for guidance is displayed on the display section 202 of the mobile device 200.

Figure 41:
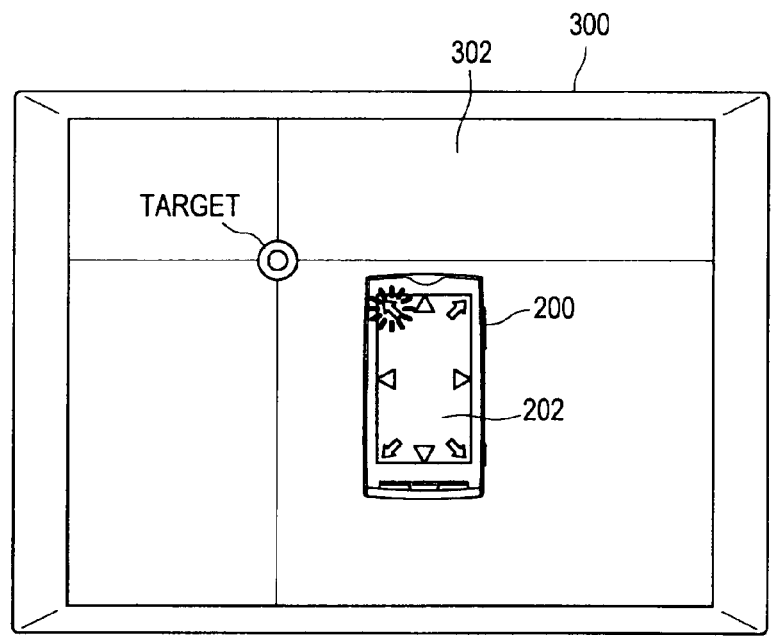
FIG. 41 is a schematic view showing a state where, when the mobile device is placed on the display section, a UI for guidance is displayed on the display section.

FIG. 41 is a schematic view showing a state where, when the mobile device 200 is placed on the display section 302, a UI for guidance is displayed on the display section 202 and the display section 302. As shown in FIG. 41, an arrow indicating an appropriate direction is displayed on the display section 202 of the mobile device 200, and by moving the mobile device 200 in the direction, the mobile device 200 can be guided to the position of the antenna 304. In the example shown in FIG. 41, an arrow at the top left of the display section 202 is displayed brighter than the other arrows (or displayed in a flashing manner), and the mobile device 200 is guided in that direction. In the case where the mobile device 200 is positioned on the antenna 304, and when the communication state becomes the best state, the fact thereof is displayed. Further, as shown in FIG. 41, there may be displayed on the display section 302 a cross indicating a "target" for the guidance to the position of the antenna. In his case, the position detection section 120 of the mobile device 200 or the information processing apparatus 300 detects a current position of the mobile device 200 and a position with the best received signal strength based on a received signal strength detected by the received signal strength (electric field intensity) detection section 114. The display processing section 118 performs display processing of guiding the mobile device 200 in the direction whose received signal strength becomes the best.

Further, as another method, there may be used a guidance method which causes the mobile device 200, which is held over the display section 302, to generate sound and vibration. In this case, since antenna sensitivity (distribution) is different between devices, the guidance is performed while correcting the antenna sensitivity. The audio/vibration output section 126 shown in FIG. 5 outputs audio or vibration for the guidance in the direction whose received signal strength becomes the best. As an example, in the case of outputting audio, audio indicating a direction whose received signal strength becomes the best is output, and audio indicating a position at which the received signal strength becomes the best is output at the position. Further, in the case of outputting vibration, vibration indicating a direction whose received signal strength becomes the best is output, and vibration is stopped at a position at which the received signal strength becomes the best.

5. Fifth Embodiment

Next, a fifth embodiment of the present invention will be described. The fifth embodiment relates to an electronic pen 400 that communicates with the information processing apparatus 300. The electronic pen 400 includes a recording section (storage device) 402 for recording data and a wireless communication section 404. The wireless communication section 404 is configured in the same manner as the configuration described in FIG. 4. The electronic pen 400 performs various content movement operations by gestures of the pen, for example, sucking and recording displayed folders and the like in a group which are enclosed by operation of the pen.

Figure 42:
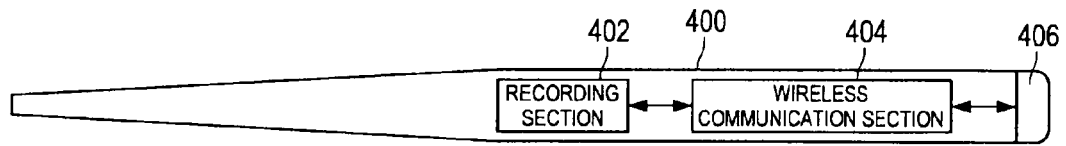
FIG. 42 is a schematic view showing a configuration of an electronic pen.

FIG. 42 is a schematic view showing a configuration of the electronic pen 400. The distal end of the electronic pen 400 configures a normal stylus with a pointed end. Further, there is provided an antenna 406 for wireless communication at the posterior end.

FIGS. 43 and 44 are each a schematic view showing a state of using the electronic pen 400. First, suction (accumulation) of data using the electronic pen 400 will be described. The suction of data is performed in the following three steps. First, as shown in FIG. 43, there is performed drawing using the distal end of the electronic pen 400 in a manner to enclose content on the display section 302. By doing so, a touch sensor 170 detects the drawing, and a line that follows a locus of a pen tip is drawn on the display section 302. In this case, one or multiple pieces of content may be enclosed.

Next, by holding the electronic pen 400 upside-down, and direct the antenna 406 at the posterior end of the electronic pen 400 toward the display section 302. Then, the posterior end of the electronic pen 400 is held over the display section 302. Accordingly, the information processing apparatus 300 and the electronic pen 400 are connected to each other via wireless communication, and the data of the enclosed content is transferred from the information processing apparatus 300 to the electronic pen 400. Since the information processing apparatus 300 recognizes the locus of the pen tip, when the connection to the electronic pen 400 is established, the information processing apparatus 300 transmits data of the content contained in this area to the electronic pen 400. The data of the content transferred to the electronic pen 400 is held by the recording section 402.

Next, discharge (transmission) of data using the electronic pen 400 will be described. The discharge of data is performed in one step. In a state where data is held by the recording section 402, when the posterior end of the electronic pen 400 is held toward the display section 302 as shown in FIG. 44, the electronic pen 400 is connected to the information processing apparatus 300 via wireless communication, and the data held by the recording section 402 is transferred to the information processing apparatus 300. Thus, the data held by the recording section 402 is copied onto a desktop of the display section 302.

Note that, as for a position at which the electronic pen 400 is held over, in the case where the electrode plates 304 are provided along the periphery of the information processing apparatus 300 as described in FIG. 3, the electronic pen 400 is to be held over in the vicinity of the antenna 304. Further, in the case where the electrode plates 304 are provided on the whole region of the display section 302 as shown in FIG. 2, the electronic pen 400 is to be held over the display section 302.

Further, the electronic pen 400 may perform: suction of data when the electronic pen 400 is held over a predetermined selection area provided on the display section 302; function selection by clicking an icon; and discharge of data when being held over an area other than the selection area.

Note that the electronic pen 400 may have the functions of the mobile device 200 described in the first to fourth embodiments. In this case, the electronic pen 400 does not have a display but can display a menu or the like. Since the electronic pen 400 has no display, the electronic pen 400 reduces its weight and is suitable for carrying around. The user can be provided with convenience and pleasure that content held by the electronic pen 400 can be confirmed in each case on the display section 302 (large-sized display) of the information processing apparatus 300.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-123317 filed in the Japan Patent Office on May 28, 2010, the entire content of which is hereby incorporated by reference.

What is claimed is:

1. An electronic pen comprising:
    a communication section on a posterior end of the electronic pen which performs short-range one-to-one communication with a communication partner device having a display section;
    a pen tip on an anterior end of the electronic pen which selects information displayed on the display section;
    a reception processing section which configures the communication section, and acquires information selected by the pen tip via communication with the communication partner device when the electronic pen is positioned upside down such that the posterior end of the electronic pen is positioned over the selected information displayed on the display section;
    a recording section which stores the acquired information; and
    a transmission processing section which configures the communication section, and transmits the acquired information stored in the recording section.

2. The electronic pen of claim 1, wherein the stored information is transmitted to another communication partner device by positioning the posterior end of the electronic pen over a display section of the another communication partner device.

3. An information processing system comprising:
    an information processing apparatus which includes a display section, and communicates with an electronic pen by short-range one-to-one communication; and
    the electronic pen which includes
        a communication section which performs, via a communication section on a posterior end of the electronic pen, short-range one-to-one communication with the information processing apparatus,
        a pen tip on an anterior end of the electronic pen that selects information displayed on the display section,
        a reception processing section which configures the communication section, and acquires information selected by the pen tip via communication with the information processing apparatus when the electronic pen is positioned upside down such that the posterior end of the electronic pen is positioned over the selected information displayed on the display section,
        a recording section which stores the acquired information, and
        a transmission processing section which configures the communication section, and transmits the acquired information stored in the recording section.

4. The information processing system of claim 3, wherein the stored information is transmitted to another communication partner device by positioning the posterior end of the electronic pen over a display section of the another communication partner device.

5. A non-transitory computer-readable medium storing computer readable instructions thereon that when executed by a computer cause the computer to perform a method comprising:

performing, via a communication section on a posterior end of the electronic pen, short-range one-to-one communication with a communication partner device having a display section;
configuring the communication section;
receiving, via a pen tip on an anterior end of the electronic pen, a selection of information displayed on the display section;
acquiring the selected information specified by by the pen tip via communication with the communication partner device when the electronic pen is positioned upside down such that the posterior end of the electronic pen is positioned over the selected information displayed on the display section;
storing the acquired information;
configuring the communication section; and
transmitting the stored information.

6. The computer-readable medium of claim 5, wherein the stored information is transmitted to another communication partner device by positioning the posterior end of the electronic pen over a display section of the another communication partner device.

\* \* \* \* \*